(12) United States Patent
Huang

(10) Patent No.: US 9,086,559 B2
(45) Date of Patent: Jul. 21, 2015

(54) OPTICAL IMAGING LENS ASSEMBLY, OPTICAL IMAGING DEVICE AND MOBILE TERMINAL

(71) Applicant: LARGAN Precision Co., Ltd., Taichung (TW)

(72) Inventor: Hsin-Hsuan Huang, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 127 days.

(21) Appl. No.: 14/078,214

(22) Filed: Nov. 12, 2013

(65) Prior Publication Data
US 2015/0098011 A1    Apr. 9, 2015

(30) Foreign Application Priority Data

Oct. 9, 2013 (TW) .............................. 102136508 A

(51) Int. Cl.
*G02B 13/00* (2006.01)
*H04N 5/225* (2006.01)

(52) U.S. Cl.
CPC .......... *G02B 13/0045* (2013.01); *H04N 5/2254* (2013.01)

(58) Field of Classification Search
CPC ........................... G02B 13/0045; H04N 5/2254
See application file for complete search history.

(56) References Cited

U.S. PATENT DOCUMENTS

| 2014/0153114 | A1* | 6/2014 | Suzuki, Hisanori .......... 359/714 |
| 2014/0168794 | A1 | 6/2014 | Tsai et al. |
| 2014/0362454 | A1 | 12/2014 | Tsai et al. |

FOREIGN PATENT DOCUMENTS

| TW | 201314251 A | 4/2013 |
| TW | 201337321 A | 9/2013 |

* cited by examiner

*Primary Examiner* — David N Spector
(74) *Attorney, Agent, or Firm* — Locke Lord, LLP; Tim Tingkang Xia, Esq.

(57) ABSTRACT

An optical imaging lens assembly includes, in order from an object side to an image side, a first lens element, a second lens element, a third lens element, a fourth lens element and a fifth lens element. The first lens element has positive refractive power. The second lens element has positive refractive power. The third lens element has positive refractive power. The fourth lens element with positive refractive power has a convex image-side surface. The fifth lens element with refractive power has a concave image-side surface in a paraxial region thereof, wherein the image-side surface of the fifth lens element has at least one convex shape in an off-axis region thereof, and the surfaces thereof are aspheric. The optical imaging lens assembly has a total of five lens elements with refractive power.

24 Claims, 18 Drawing Sheets

OPTICAL IMAGING LENS ASSEMBLY, OPTICAL IMAGING DEVICE AND MOBILE TERMINAL

RELATED APPLICATIONS

This application claims priority to Taiwan Application Serial Number 102136508, filed on 2013 Oct. 9, which is incorporated by reference herein in its entirety.

BACKGROUND

1. Technical Field

The present disclosure relates to an optical imaging lens assembly, optical imaging device and mobile. More particularly, the present disclosure relates to a compact optical imaging lens assembly and optical imaging device applicable to mobile terminals.

2. Description of Related Art

In recent years, with the popularity of mobile products having camera functionalities, the demand of miniaturized optical systems has been increasing. The sensor of a conventional optical system is typically a CCD (Charge-Coupled Device) or a CMOS (Complementary Metal-Oxide-Semiconductor) sensor. As the advanced semiconductor manufacturing technologies have allowed the pixel size of sensors to be reduced and compact optical systems have gradually evolved toward the field of higher megapixels, there is an increasing demand for compact optical systems featuring better image quality.

A conventional optical system employed in a portable electronic product mainly adopts a four-element lens structure. Due to the popularity of mobile terminals with high-end specifications, such as smart phones, tablet personal computers and wearable apparatus, the requirements for high resolution and image quality of present compact optical systems increase significantly. However, the conventional optical systems cannot satisfy these requirements of the compact optical systems.

Other conventional compact optical systems with five-element lens structure enhance image quality and resolution. However, the distribution of the refractive powers of the optical imaging lens assembly is not favorable for reducing the total track length and correcting the aberration. Accordingly, these are not applicable to mobile terminals featuring better image quality.

SUMMARY

According to one aspect of the present disclosure, an optical imaging lens assembly includes, in order from an object side to an image side, a first lens element, a second lens element, a third lens element, a fourth lens element and a fifth lens element. The first lens element has positive refractive power. The second lens element has positive refractive power. The third lens element has positive refractive power. The fourth lens element with positive refractive power has a convex image-side surface. The fifth lens element with refractive power has a concave image-side surface in a paraxial region thereof, wherein the image-side surface of the fifth lens element has at least one convex shape in an off-axis region thereof, and an object-side surface and the image-side surface of the fifth lens element are aspheric. The optical imaging lens assembly has a total of five lens elements with refractive power. When a focal length of the optical imaging lens assembly is f, and a curvature radius of the image-side surface of the fourth lens element is R8, the following condition is satisfied:

$-0.45 < R8/f < 0.$

According to another aspect of the present disclosure, an optical imaging lens assembly includes, in order from an object side to an image side, a first lens element, a second lens element, a third lens element, a fourth lens element and a fifth lens element. The first lens element with positive refractive power has a convex object-side surface. The second lens element with positive refractive power has a concave object-side surface and a convex image-side surface. The third lens element has positive refractive power. The fourth lens element has positive refractive power. The fifth lens element with refractive power has a concave image-side surface in a paraxial region thereof, wherein the image-side surface of the fifth lens element has at least one convex shape in an off-axis region thereof, and an object-side surface and the image-side surface of the fifth lens element are aspheric. The optical imaging lens assembly has a total of five lens elements with refractive power.

According to still another aspect of the present disclosure, an optical imaging lens assembly includes, in order from an object side to an image side, a first lens element, a second lens element, a third lens element, a fourth lens element and a fifth lens element. The first lens element with positive refractive power has a convex object-side surface. The second lens element has positive refractive power. The third lens element has positive refractive power. The fourth lens element has positive refractive power. The fifth lens element with refractive power has a concave image-side surface in a paraxial region thereof, wherein the image-side surface of the fifth lens element has at least one convex shape in an off-axis region thereof, and an object-side surface and the image-side surface of the fifth lens element are aspheric. The optical imaging lens assembly has a total of five lens elements with refractive power. When an axial distance between the second lens element and the third lens element is T23, and an axial distance between the first lens element and the second lens element is T12, the following condition is satisfied:

$0 < T23/T12 < 1.3.$

According to yet another aspect of the present disclosure, an optical imaging lens assembly includes, in order from an object side to an image side, a first lens element, a second lens element, a third lens element, a fourth lens element and a fifth lens element. The first lens element has positive refractive power. The second lens element has positive refractive power. The third lens element has positive refractive power. The fourth lens element has positive refractive power. The fifth lens element with refractive power has a concave image-side surface in a paraxial region thereof, wherein the image-side surface of the fifth lens element has at least one convex shape in an off-axis region thereof, and an object-side surface and the image-side surface of the fifth lens element are aspheric. The optical imaging lens assembly has a total of five lens elements with refractive power. When a focal length of the first lens element is f1, and a focal length of the fourth lens element is f4, the following condition is satisfied:

$0 < f4/f1 < 1.85.$

According to still yet another aspect of the present disclosure, an optical imaging device includes an optical imaging lens assembly according to the yet another aspect and an image sensor, wherein the image sensor is located on an image plane of the optical imaging lens assembly. The optical imaging lens assembly includes, in order from an object side to an image side, a first lens element, a second lens element, a third lens element, a fourth lens element and a fifth lens element. The first lens element has positive refractive power. The second lens element has positive refractive power. The third lens element has positive refractive power. The fourth lens element has positive refractive power. The fifth lens element with refractive power has a concave image-side surface in a paraxial region thereof, wherein the image-side surface of the fifth lens element has at least one convex shape in an off-axis region thereof, and an object-side surface and the image-side surface of the fifth lens element are aspheric. The optical imaging lens assembly has a total of five lens elements with refractive power. When a focal length of the first lens element is f1, and a focal length of the fourth lens element is f4, the following condition is satisfied:

$$0 < f4/f1 < 1.85.$$

According to a further aspect of the present disclosure, a mobile terminal includes an optical imaging device. The optical imaging device includes an optical imaging lens assembly according to the yet another aspect and an image sensor, wherein the image sensor is located on an image plane of the optical imaging lens assembly. The optical imaging lens assembly includes, in order from an object side to an image side, a first lens element, a second lens element, a third lens element, a fourth lens element and a fifth lens element. The first lens element has positive refractive power. The second lens element has positive refractive power. The third lens element has positive refractive power. The fourth lens element has positive refractive power. The fifth lens element with refractive power has a concave image-side surface in a paraxial region thereof, wherein the image-side surface of the fifth lens element has at least one convex shape in an off-axis region thereof, and an object-side surface and the image-side surface of the fifth lens element are aspheric. The optical imaging lens assembly has a total of five lens elements with refractive power. When a focal length of the first lens element is f1, and a focal length of the fourth lens element is f4, the following condition is satisfied:

$$0 < f4/f1 < 1.85.$$

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1:
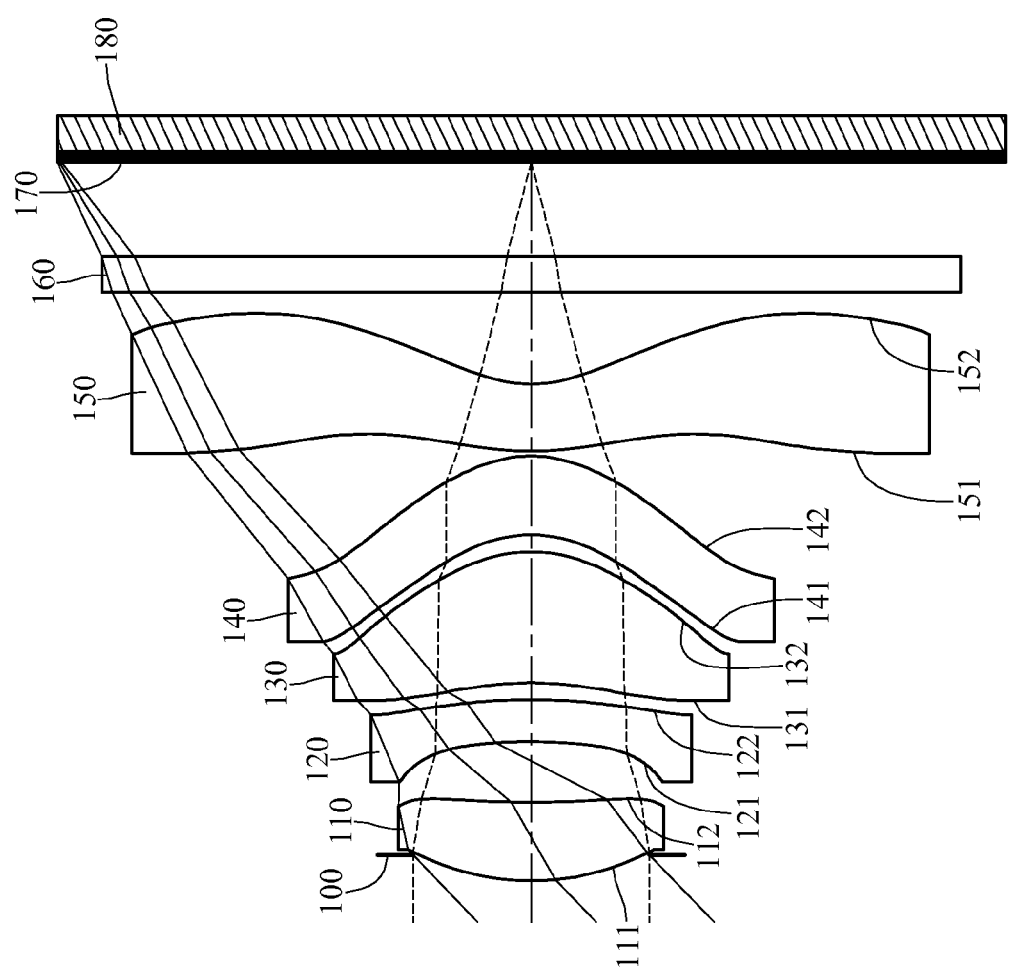
FIG. 1 is a schematic view of an optical imaging device according to the 1st embodiment of the present disclosure.

An optical imaging lens assembly includes, in order from an object side to an image side, a first lens element, a second lens element, a third lens element, a fourth lens element and a fifth lens element. The optical imaging lens assembly has a total of five lens elements with refractive power.

The first lens element has positive refractive power, so that it provides the optical imaging lens assembly with the positive refractive power as it needs to be so as to effectively reduce the total track length. The first lens element can have a convex object-side surface, so that it is favorable for reducing the total track length.

The second lens element has positive refractive power. Therefore, it is favorable for reducing the photosensitivity of the optical imaging lens assembly. The second lens element can have a concave object-side surface and a convex image-side surface, so that it is favorable for correcting astigmatism.

The third lens element has positive refractive power, so that it is favorable for effectively balancing the distribution of the positive refractive powers. The third lens element can have a concave object-side surface and a convex image-side surface, so that it is favorable for reducing the astigmatism.

The fourth lens element has positive refractive power, so that it is favorable for effectively correcting aberration. The fourth lens element can have a concave object-side surface and a convex image-side surface, so that it is favorable for correcting the astigmatism.

The fifth lens element can have negative refractive power, so that it is favorable for correcting the aberration. The fifth lens element can have a convex object-side surface and a concave image-side surface in a paraxial region thereof, wherein the image-side surface of the fifth lens element has at least one convex shape in an off-axis region thereof. Therefore, it is favorable for the principal point being positioned away from the image plane so as to reduce the total track length and keep the optical imaging lens assembly compact. It is also favorable for effectively correcting the aberration of the off-axis.

The first through fourth lens elements all have positive refractive power; therefore, it is favorable for effectively distributing the light gathering ability of the optical imaging lens assembly so as to avoid the aberration from being excessively increased in a peripheral region of an image. Furthermore, it is also favorable for effectively reducing the refractive power of the first lens element so as to enlarge the field of view of optical imaging lens assembly and effectively reduce the distortion in the peripheral region of the image.

The product of a curvature radius of an object-side surface of each lens element multiplied by a curvature radius of the corresponding image-side surface of the same lens element in the optical imaging lens assembly can be positive. In other words, the product of a curvature radius of the object-side surface of the first lens element multiplied by a curvature radius of the image-side surface of the first lens element can be positive; the product of a curvature radius of the object-side surface of the second lens element multiplied by a curvature radius of the image-side surface of the second lens element can be positive; the product of a curvature radius of the object-side surface of the third lens element multiplied by a curvature radius of the image-side surface of the third lens element can be positive; the product of a curvature radius of the object-side surface of the fourth lens element multiplied by a curvature radius of the image-side surface of the fourth lens element can be positive; the product of a curvature radius of the object-side surface of the fifth lens element multiplied by a curvature radius of the image-side surface of the fifth lens element can be positive. Therefore, it is favorable for correcting the astigmatism.

When a focal length of the optical imaging lens assembly is f, and a curvature radius of the image-side surface of the fourth lens element is R8, the following condition is satisfied: $-0.45<R8/f<0$. Therefore, it is favorable for reducing the photosensitivity.

When an axial distance between the first lens element and the second lens element is T12, and an axial distance between the second lens element and the third lens element is T23, the following condition is satisfied: $0<T23/T12<1.3$. Therefore, it is favorable for properly adjusting the axial distance between each lens element so as to effectively assembly the lens elements and further increase the manufacturing yield rate.

When a focal length of the first lens element is f1, and a focal length of the fourth lens element is f4, the following condition is satisfied: $0<f4/f1<1.85$. Therefore, it is favorable for reducing the photosensitivity of the optical imaging lens assembly. Preferably, the following condition is satisfied: $0<f4/f1<1.55$.

When a distance in parallel with an optical axis from an axial vertex on the image-side surface of the fourth lens element to a maximum effective radius position on the image-side surface of the fourth lens element is SAG42, and a central thickness of the fourth lens element is CT4, the following condition is satisfied: $SAG42+CT4<0$ mm. Therefore, it is favorable for manufacturing and molding the lens elements and reducing the required space for assembling the lens elements so as to keep the lens elements more compact. When the distance towards the object side of the optical imaging lens assembly, SAG42 is negative; when the distance towards the image side of the optical imaging lens assembly, SAG42 is positive.

When an axial distance between the object-side surface of the first lens element and the image plane is TTL (the value of TTL is calculated on the assumption that a space of any parallel flat plate component(s) are regarded as an air-equivalent distance), and a maximum image height of the optical imaging lens assembly (half of a diagonal length of an effective photosensitive area of an image sensor) is ImgH, the following condition is satisfied: $TTL/ImgH<1.9$. Therefore, it is favorable for maintaining a compact size of the optical imaging lens assembly so as to be applied to portable electronic products.

When an Abbe number of the fifth lens element is V5, the following condition is satisfied: $V5<30$. Therefore, the chromatic aberration of the optical imaging lens assembly can be corrected.

When half of a maximal field of view of the optical imaging lens assembly is HFOV, the following condition is satisfied: 38 degrees<HFOV<60 degrees. Therefore, it is favorable for enlarging the field of view so as to obtain more of the image scene.

When the focal length of the first lens element is f1, and a focal length of the second lens element is f2, the following condition is satisfied: $0<f1/f2<2$. Therefore, it is favorable for reducing spherical aberration and the photosensitivity.

When an Abbe number of the first lens element is V1, an Abbe number of the second lens element is V2, an Abbe number of the third lens element is V3, an Abbe number of the fourth lens element is V4, and the Abbe number of the fifth lens element is V5, the following condition is satisfied: $0.4<(V2+V4+V5)/(V1+V3)<1.0$. Therefore, the chromatic aberration of the optical imaging lens assembly can be corrected.

According to the optical imaging lens assembly of the present disclosure, the lens elements thereof can be made of glass or plastic material. When the lens elements are made of glass material, the distribution of the refractive power of the optical imaging lens assembly may be more flexible to design. When the lens elements are made of plastic material, the manufacturing cost can be effectively reduced. Furthermore, surfaces of each lens element can be arranged to be aspheric, since the aspheric surface of the lens element is easy to form a shape other than spherical surface so as to have more controllable variables for eliminating the aberration thereof, and to further decrease the required number of the lens elements. Therefore, the total track length of the optical imaging lens assembly can also be reduced.

According to the optical imaging lens assembly of the present disclosure, each of an object-side surface and an image-side surface has a paraxial region and an off-axis region. The paraxial region refers to the region of the surface where light rays travel close to the optical axis, and the off-axis region refers to the region of the surface where light rays travel away from the optical axis. Particularly, when the lens element has a convex surface, it indicates that the surface is convex in the paraxial region thereof; when the lens element has a concave surface, it indicates that the surface is concave in the paraxial region thereof.

According to the optical imaging lens assembly of the present disclosure, any parallel flat plate component(s) can be IR-cut filter(s), IR-pass filter(s), blue glass(es), cover glass(es), and/or similar parallel flat plate component(s).

According to the optical imaging lens assembly of the present disclosure, the optical imaging lens assembly can include at least one stop, such as an aperture stop, a glare stop or a field stop. Said glare stop or said field stop is for eliminating the stray light and thereby improving the image resolution thereof.

According to the optical imaging lens assembly of the present disclosure, an aperture stop can be configured as a front stop or a middle stop. A front stop disposed between an imaged object and the first lens element can provide a longer distance between an exit pupil of the optical imaging lens assembly and the image plane and thereby improves the image-sensing efficiency of an image sensor. A middle stop disposed between the first lens element and the image plane is favorable for enlarging the field of view of the optical imaging lens assembly and thereby provides a wider field of view for the same.

The present optical imaging lens assembly can be optionally applied to moving focus or zoom optical systems. According to the optical imaging lens assembly of the present disclosure, the optical imaging lens assembly is featured with good correction ability and high image quality, and can be applied to 3D (three-dimensional) image capturing applications, in products such as digital cameras, mobile devices, digital tablets, wearable devices and other mobile terminals.

According to the present disclosure, an optical imaging device is provided. The optical imaging device includes the optical imaging lens assembly according to the aforementioned optical imaging lens assembly of the present disclosure, and an image sensor, wherein the image sensor is disposed on an image plane of the aforementioned optical imaging lens assembly. It is favorable for distributing the light gathering ability so as to avoid the aberration from being excessively increased in a peripheral region of an image. Furthermore, it is also favorable for reducing the refractive power of the first lens element so as to enlarge the field of view and effectively reduce the distortion of the image in the peripheral region. Preferably, the optical imaging device can further include a barrel member and/or a holding member.

Figure 18:
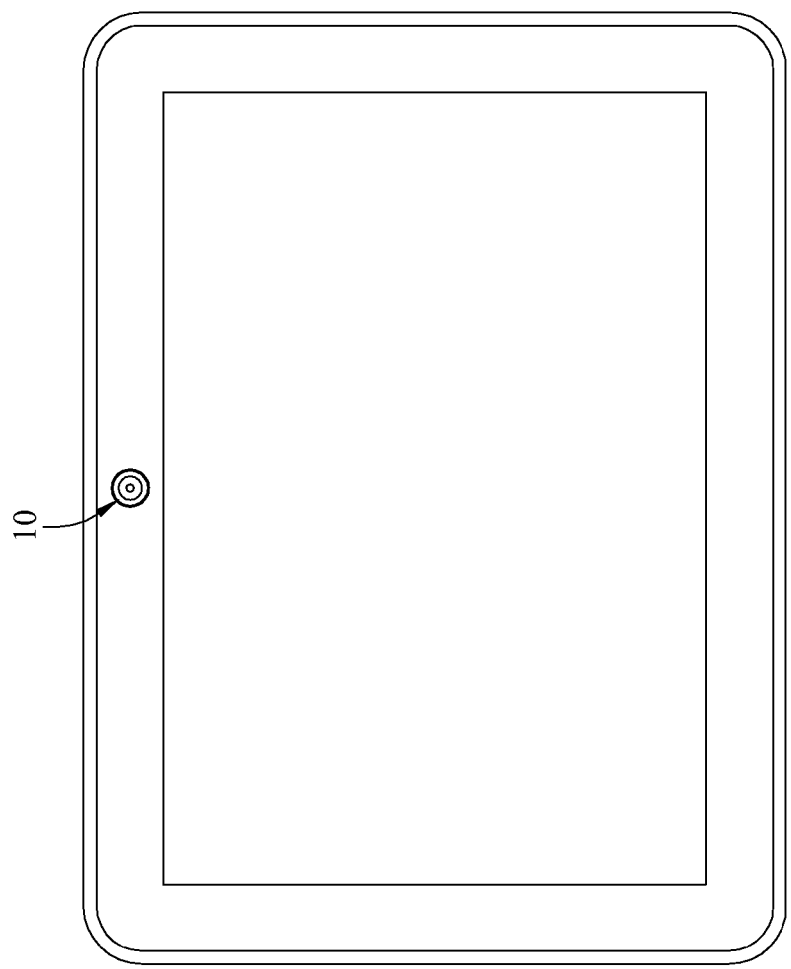
FIG. 18 shows a tablet personal computer with an optical imaging device of the present disclosure installed therein.
Figure 17:
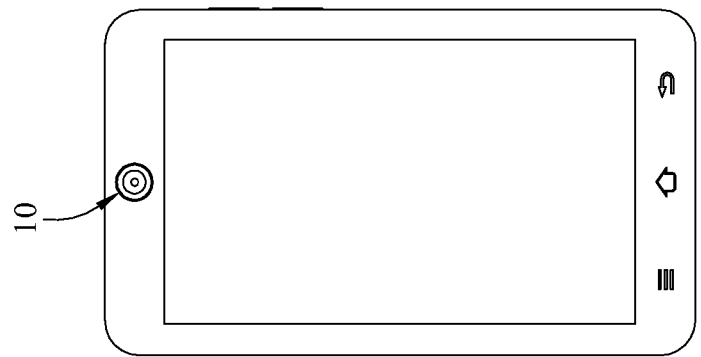
FIG. 17 shows a smart phone with an optical imaging device of the present disclosure installed therein.
Figure 19:
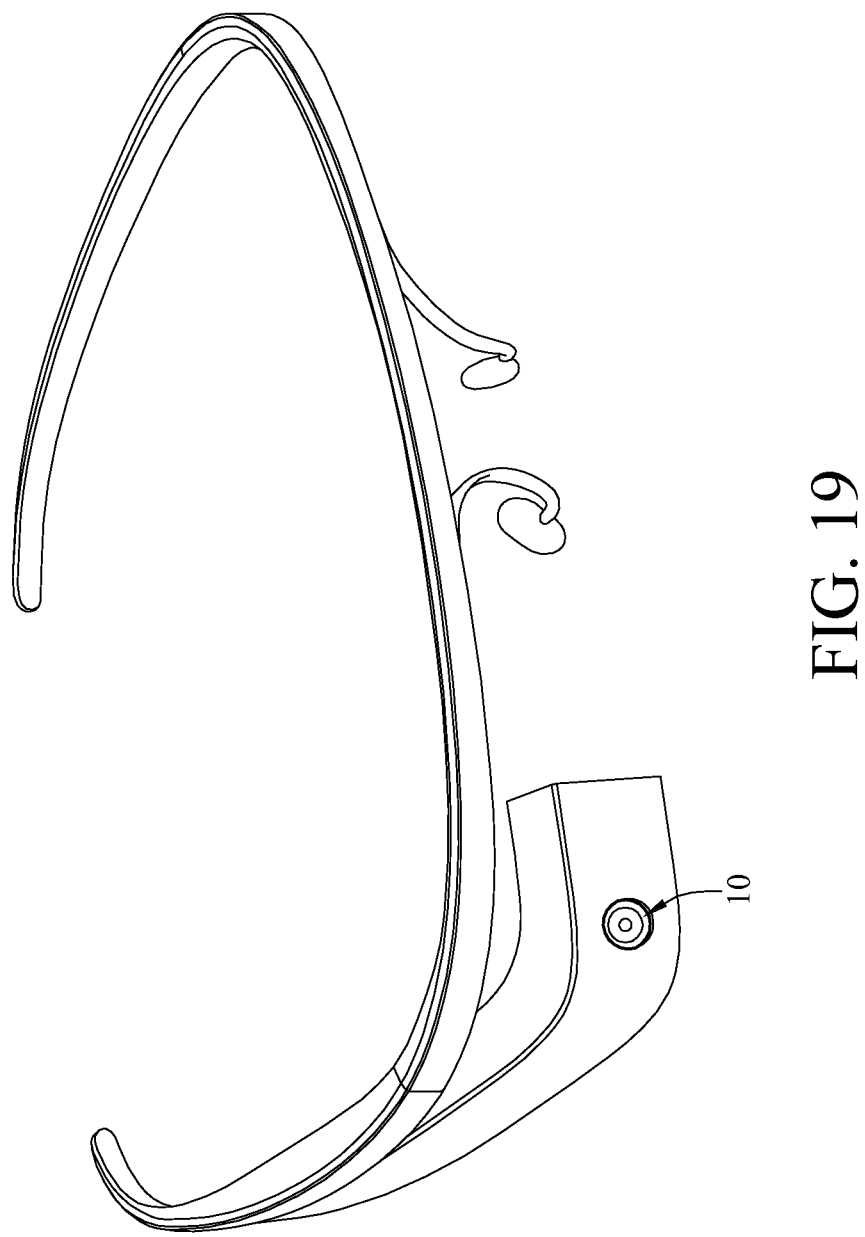
FIG. 19 shows a wearable device with an optical imaging device of the present disclosure installed therein.

According to the present disclosure, a mobile terminal is provided, wherein the mobile terminal includes an optical imaging device. In FIGS. 17-19, the optical imaging device 10 can be applied to a smart phone (FIG. 17), a tablet personal computer (FIG. 18) or a wearable device (FIG. 19). It is favorable for distributing the light gathering ability so as to avoid the aberration from being excessively increased in a peripheral region of an image. Furthermore, it is also favorable for reducing the refractive power of the first lens element so as to enlarge the field of view and effectively reduce the distortion of the image in the peripheral region. Preferably, the mobile terminal can further include but not limited to display, control unit, random access memory unit (RAM) and/or read only memory unit (ROM).

According to the above description of the present disclosure, the following 1st-8th specific embodiments are provided for further explanation.

1st Embodiment

Figure 2:
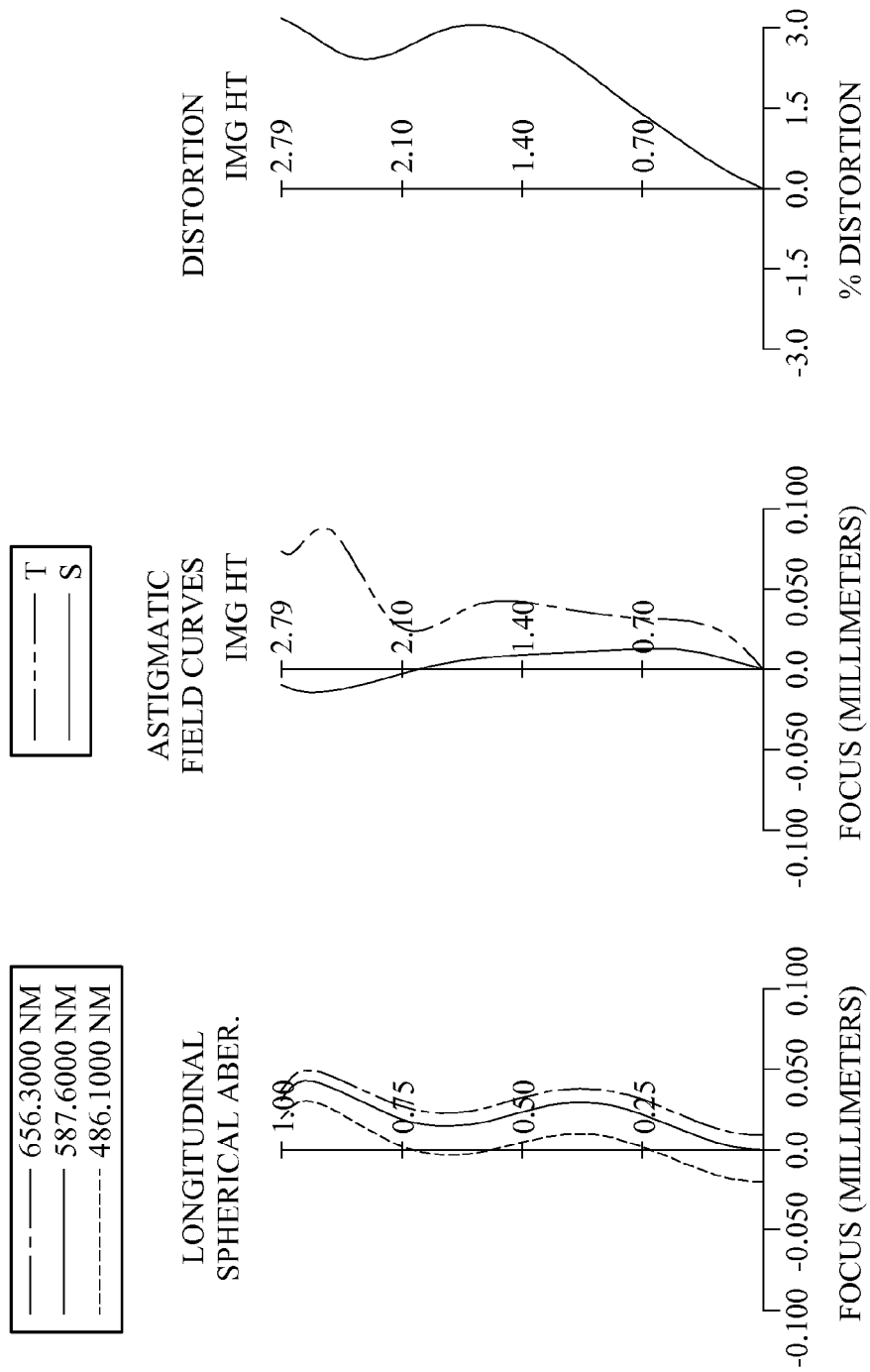
FIG. 2 shows spherical aberration curves, astigmatic field curves and a distortion curve of the optical imaging device according to the 1st embodiment.

FIG. 1 is a schematic view of an optical imaging device according to the 1st embodiment of the present disclosure. FIG. 2 shows, in order from left to right, spherical aberration curves, astigmatic field curves and a distortion curve of the optical imaging device according to the 1st embodiment.

In FIG. 1, the optical imaging device includes the optical imaging lens assembly (not otherwise herein labeled) of the present disclosure and an image sensor 180. The optical imaging lens assembly includes, in order from an object side to an image side, an aperture stop 100, a first lens element 110, a second lens element 120, a third lens element 130, a fourth lens element 140, a fifth lens element 150, an IR-cut filter 160 and an image plane 170, wherein the optical imaging lens assembly has a total of five lens elements (110-150) with refractive power.

The first lens element 110 with positive refractive power has a convex object-side surface 111 and a concave image-side surface 112, which are both aspheric, and the first lens element 110 is made of plastic material.

The second lens element 120 with positive refractive power has a concave object-side surface 121 and a convex image-side surface 122, which are both aspheric, and the second lens element 120 is made of plastic material.

The third lens element 130 with positive refractive power has a concave object-side surface 131 and a convex image-side surface 132, which are both aspheric, and the third lens element 130 is made of plastic material.

The fourth lens element 140 with positive refractive power has a concave object-side surface 141 and a convex image-side surface 142, which are both aspheric, and the fourth lens element 140 is made of plastic material.

The fifth lens element 150 with negative refractive power has a convex object-side surface 151 and a concave image-side surface 152, which are both aspheric, and the fifth lens element 150 is made of plastic material. Specifically, the fifth lens element 150 has a concave image-side surface 152 in a paraxial region thereof, wherein the image-side surface 152 of the fifth lens element 150 has at least one convex shape in an off-axis region thereof.

The IR-cut filter 160 is made of glass and located between the fifth lens element 150 and the image plane 170, and will not affect the focal length of the optical imaging lens assembly. The image sensor 180 is disposed on the image plane 170 of the optical imaging lens assembly.

The equation of the aspheric surface profiles of the aforementioned lens elements of the 1st embodiment is expressed as follows:

$$X(Y) = (Y^2/R)/(1 + sqrt(1-(1+k)\times(Y/R)^2)) + \sum_i (Ai)\times(Y^i),$$

where,

X is the relative distance between a point on the aspheric surface spaced at a distance Y from the optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient.

In the optical imaging lens assembly according to the 1st embodiment, when a focal length of the optical imaging lens assembly is f, an f-number of the optical imaging lens assembly is Fno, and half of a maximal field of view of the optical imaging lens assembly is HFOV, these parameters have the following values: f=2.81 mm; Fno=2.00; and HFOV=43.9 degrees.

In the optical imaging lens assembly according to the 1st embodiment, when an Abbe number of the fifth lens element 150 is V5, and the following condition is satisfied: V5=23.5.

In the optical imaging lens assembly according to the 1st embodiment, when an Abbe number of the first lens element 110 is V1, an Abbe number of the second lens element 120 is V2, an Abbe number of the third lens element 130 is V3, an Abbe number of the fourth lens element 140 is V4, and the Abbe number of the fifth lens element 150 is V5, the following condition is satisfied: (V2+V4+V5)/(V1+V3)=0.94.

In the optical imaging lens assembly according to the 1st embodiment, when an axial distance between the first lens element 110 and the second lens element 120 is T12, and an axial distance between the second lens element 120 and the third lens element 130 is T23, the following condition is satisfied: T23/T12=0.28.

In the optical imaging lens assembly according to the 1st embodiment, when the focal length of the optical imaging lens assembly is f, and a curvature radius of the image-side surface 142 of the fourth lens element 140 is R8, the following condition is satisfied: R8/f=−0.27.

In the optical imaging lens assembly according to the 1st embodiment, when a focal length of the first lens element 110 is f1, and a focal length of the second lens element 120 is f2, the following condition is satisfied: f1/f2=0.07.

In the optical imaging lens assembly according to the 1st embodiment, when the focal length of the first lens element 110 is f1, and a focal length of the fourth lens element 140 is f4, the following condition is satisfied: f4/f1=1.47.

In the optical imaging lens assembly according to the 1st embodiment, when a distance in parallel with an optical axis from an axial vertex on the image-side surface 142 of the fourth lens element 140 to a maximum effective radius position on the image-side surface 142 of the fourth lens element 140 is SAG42, and a central thickness of the fourth lens element 140 is CT4, the following condition is satisfied: SAG42+CT4=−0.26 mm.

In the optical imaging lens assembly according to the 1st embodiment, when the axial distance between the object-side surface 111 of the first lens element 110 and the image plane 170 is TTL, and a maximum image height of the optical imaging lens assembly (half of a diagonal length of an effective photosensitive area of the image sensor 180) is ImgH, the following condition is satisfied: TTL/ImgH=1.50.

The detailed optical data of the 1st embodiment are shown in Table 1 and the aspheric surface data are shown in Table 2 below.

TABLE 1

1st Embodiment
f = 2.81 mm, Fno = 2.00, HFOV = 43.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.155 | | | | |
| 2 | Lens 1 | 1.509 | ASP | 0.467 | Plastic | 1.535 | 55.7 | 3.70 |
| 3 | | 5.663 | ASP | 0.360 | | | | |
| 4 | Lens 2 | −3.793 | ASP | 0.250 | Plastic | 1.614 | 25.6 | 51.36 |
| 5 | | −3.471 | ASP | 0.100 | | | | |
| 6 | Lens 3 | −1.985 | ASP | 0.780 | Plastic | 1.544 | 55.9 | 2.15 |
| 7 | | −0.837 | ASP | 0.101 | | | | |
| 8 | Lens 4 | −0.780 | ASP | 0.468 | Plastic | 1.544 | 55.9 | 5.45 |
| 9 | | −0.748 | ASP | 0.030 | | | | |
| 10 | Lens 5 | 1.912 | ASP | 0.397 | Plastic | 1.639 | 23.5 | −2.08 |
| 11 | | 0.721 | ASP | 0.550 | | | | |
| 12 | IR-cut filter | Plano | | 0.210 | Glass | 1.517 | 64.2 | — |
| 13 | | Plano | | 0.559 | | | | |
| 14 | Image | Plano | | — | | | | |

Note:
Reference wavelength is 587.6 nm (d-line).

TABLE 2

Aspheric Coefficients

| Surface # | 2 | 3 | 4 | 5 | 6 |
|---|---|---|---|---|---|
| k = | 2.1542E−01 | −1.6671E+01 | −1.6222E+01 | −5.0000E+01 | −1.5900E+01 |
| A4 = | −7.6912E−03 | 1.1544E−02 | −2.8874E−01 | −1.3288E−01 | −6.1864E−02 |
| A6 = | 7.2263E−02 | −4.9363E−01 | 5.4603E−01 | 4.3173E−01 | 1.9869E−01 |
| A8 = | −2.2723E−01 | 1.9313E+00 | −3.9158E+00 | −1.0106E+00 | 7.8172E−02 |
| A10 = | 4.0566E−02 | −5.3799E+00 | 9.9925E+00 | 1.5746E+00 | −3.6876E−01 |
| A12 = | 5.1214E−01 | 6.6490E+00 | −1.4236E+01 | −1.3784E+00 | 2.6595E−01 |
| A14 = | −8.4253E−01 | −3.7835E+00 | 7.8660E+00 | 5.2722E−01 | −6.1526E−02 |

| Surface # | 7 | 8 | 9 | 10 | 11 |
|---|---|---|---|---|---|
| k = | −3.8737E+00 | −1.7393E+00 | −3.4953E+00 | −1.6762E+00 | −3.8093E+00 |
| A4 = | −4.9841E−01 | −3.5706E−01 | −3.9243E−01 | −2.0719E−01 | −1.0002E−01 |
| A6 = | 1.0174E+00 | 1.2074E+00 | 6.5856E−01 | 6.8593E−02 | 3.7285E−02 |
| A8 = | −1.0650E+00 | −1.7486E+00 | −7.7550E−01 | −1.2585E−02 | −9.3322E−03 |
| A10 = | 4.6607E−01 | 1.4690E+00 | 6.0625E−01 | 2.8732E−03 | 1.2031E−03 |
| A12 = | −4.9666E−02 | −7.8876E−01 | −2.6609E−01 | −7.9697E−04 | −1.2534E−05 |
| A14 = | — | 2.6919E−01 | 5.9866E−02 | 1.2801E−04 | −1.2369E−05 |
| A16 = | — | −4.3118E−02 | −5.4789E−03 | −8.2520E−06 | 8.0867E−07 |

In Table 1, the curvature radius, the thickness and the focal length are shown in millimeters (mm). Surface numbers 0-14 represent the surfaces sequentially arranged from the object-side to the image-side along the optical axis. In Table 2, k represents the conic coefficient of the equation of the aspheric surface profiles. A4-A16 represent the aspheric coefficients ranging from the 4th order to the 16th order. This information related to Table 1 and Table 2 applies also to the Tables for the remaining embodiments, and so an explanation in this regard will not be provided again.

2nd Embodiment

Figure 3:
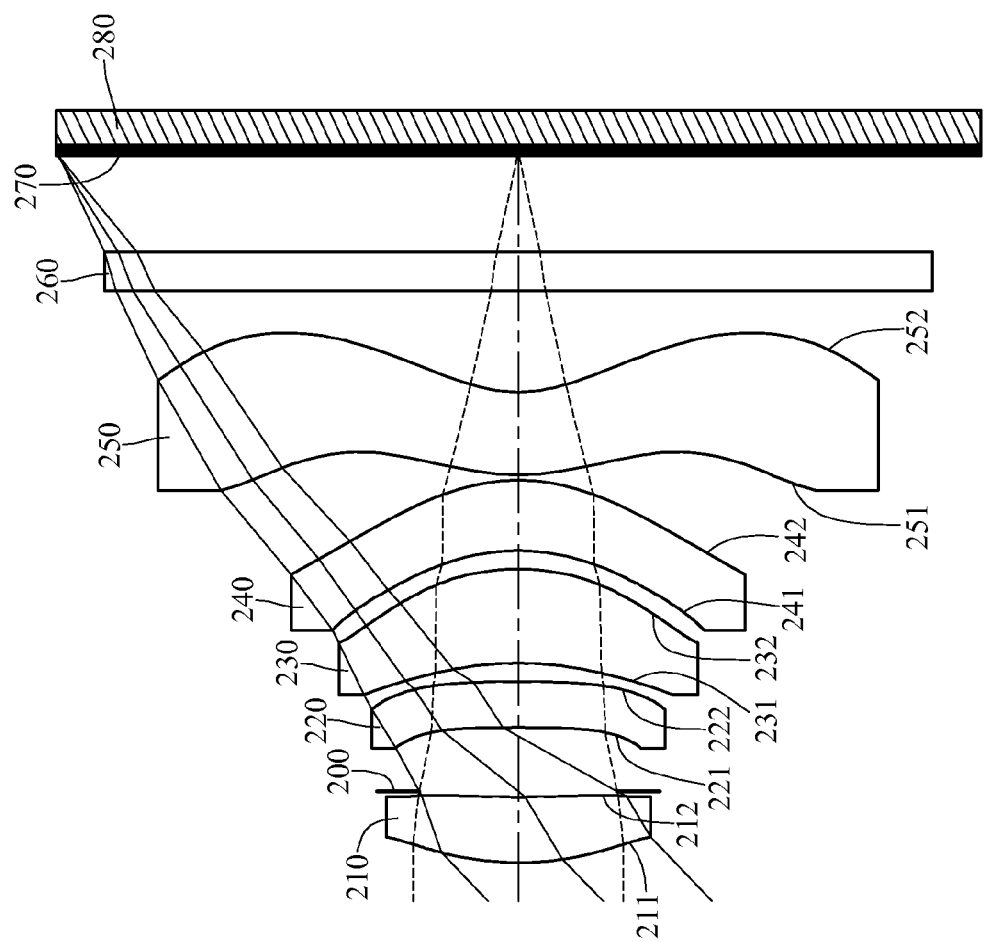
FIG. 3 is a schematic view of an optical imaging device according to the 2nd embodiment of the present disclosure.
Figure 4:
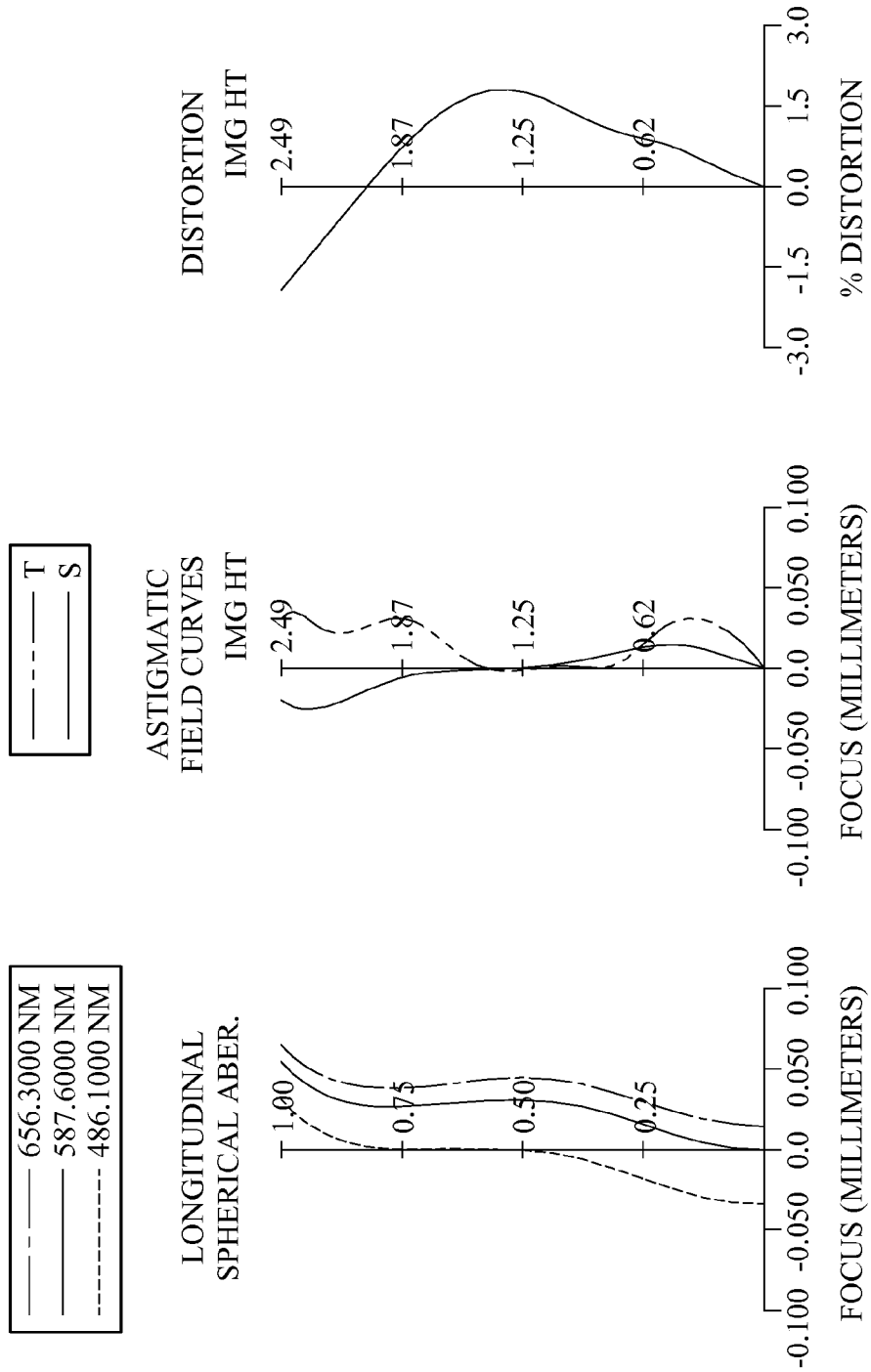
FIG. 4 shows spherical aberration curves, astigmatic field curves and a distortion curve of the optical imaging device according to the 2nd embodiment.

FIG. 3 is a schematic view of an optical imaging device according to the 2nd embodiment of the present disclosure. FIG. 4 shows, in order from left to right, spherical aberration curves, astigmatic field curves and a distortion curve of the optical imaging device according to the 2nd embodiment.

In FIG. 3, the optical imaging device includes the optical imaging lens assembly (not otherwise herein labeled) of the present disclosure and an image sensor 280. The optical imaging lens assembly includes, in order from an object side to an image side, a first lens element 210, an aperture stop 200, a second lens element 220, a third lens element 230, a fourth lens element 240, a fifth lens element 250, an IR-cut filter 260 and an image plane 270, wherein the optical imaging lens assembly has a total of five lens elements (210-250) with refractive power.

The first lens element 210 with positive refractive power has a convex object-side surface 211 and a concave image-side surface 212, which are both aspheric, and the first lens element 210 is made of plastic material.

The second lens element 220 with positive refractive power has a concave object-side surface 221 and a convex image-side surface 222, which are both aspheric, and the second lens element 220 is made of plastic material.

The third lens element 230 with positive refractive power has a concave object-side surface 231 and a convex image-side surface 232, which are both aspheric, and the third lens element 230 is made of plastic material.

The fourth lens element 240 with positive refractive power has a concave object-side surface 241 and a convex image-side surface 242, which are both aspheric, and the fourth lens element 240 is made of plastic material.

The fifth lens element 250 with negative refractive power has a convex object-side surface 251 and a concave image-side surface 252, which are both aspheric, and the fifth lens element 250 is made of plastic material. Specifically, the fifth lens element 250 has a concave image-side surface 252 in a paraxial region thereof, wherein the image-side surface 252 of the fifth lens element 250 has at least one convex shape in an off-axis region thereof.

The IR-cut filter 260 is made of glass and located between the fifth lens element 250 and the image plane 270, and will not affect the focal length of the optical imaging lens assembly. The image sensor 280 is disposed on the image plane 270 of the optical imaging lens assembly.

The detailed optical data of the 2nd embodiment are shown in Table 3 and the aspheric surface data are shown in Table 4 below.

TABLE 3

2nd Embodiment
f = 2.63 mm, Fno = 2.30, HFOV = 43.9 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 1.562 ASP | 0.358 | Plastic | 1.544 | 55.9 | 3.61 |
| 2 | | 7.008 ASP | 0.031 | | | | |
| 3 | Ape. Stop | Plano | 0.347 | | | | |
| 4 | Lens 2 | −14.616 ASP | 0.250 | Plastic | 1.607 | 26.6 | 21.91 |
| 5 | | −7.010 ASP | 0.100 | | | | |
| 6 | Lens 3 | −1.768 ASP | 0.510 | Plastic | 1.544 | 55.9 | 6.78 |
| 7 | | −1.317 ASP | 0.100 | | | | |
| 8 | Lens 4 | −1.253 ASP | 0.384 | Plastic | 1.640 | 23.3 | 5.06 |
| 9 | | −1.012 ASP | 0.030 | | | | |
| 10 | Lens 5 | 1.341 ASP | 0.449 | Plastic | 1.640 | 23.3 | −3.58 |
| 11 | | 0.735 ASP | 0.550 | | | | |
| 12 | IR-cut filter | Plano | 0.210 | Glass | 1.517 | 64.2 | — |
| 13 | | Plano | 0.524 | | | | |
| 14 | Image | Plano | — | | | | |

Note:
Reference wavelength is 587.6 nm (d-line).

TABLE 4

Aspheric Coefficients

| Surface # | 1 | 2 | 4 | 5 | 6 |
|---|---|---|---|---|---|
| k = | −6.9181E−01 | −9.0000E+01 | 1.0000E+00 | 1.0000E+00 | −9.0851E+00 |
| A4 = | −1.6747E−02 | −3.7358E−02 | −3.7256E−01 | −2.3815E−01 | −1.2601E−01 |
| A6 = | 4.8040E−04 | −5.2123E−01 | 3.2932E−01 | 3.3496E−01 | 1.9287E−01 |
| A8 = | −2.7117E−01 | 1.4076E+00 | −3.4324E+00 | −1.0956E+00 | 6.0238E−02 |
| A10 = | −1.9596E−01 | −4.5033E+00 | 9.4175E+00 | 1.4565E+00 | −4.1473E−01 |
| A12 = | 5.1214E−01 | 6.6490E+00 | −1.4236E+01 | −1.3777E+00 | 2.7612E−01 |
| A14 = | −8.4253E−01 | −3.7835E+00 | 7.8660E+00 | 5.3086E−01 | −6.4012E−02 |

TABLE 4-continued

| Aspheric Coefficients | | | | | |
|---|---|---|---|---|---|
| Surface # | 7 | 8 | 9 | 10 | 11 |
| k = | −2.3512E+00 | −1.0000E+00 | −6.0064E+00 | −2.9262E+00 | −3.6894E+00 |
| A4 = | −4.9930E−01 | −3.6016E−01 | −3.7137E−01 | −2.5487E−01 | −1.3648E−01 |
| A6 = | 9.8813E−01 | 1.2122E+00 | 6.6716E−01 | 7.0389E−02 | 4.5132E−02 |
| A8 = | −1.0621E+00 | −1.7756E+00 | −7.7579E−01 | −1.0571E−02 | −1.0792E−02 |
| A10 = | 4.9817E−01 | 1.4612E+00 | 6.0104E−01 | 3.3418E−03 | 1.2169E−03 |
| A12 = | −9.3101E−03 | −7.5702E−01 | −2.6965E−01 | −7.0191E−04 | −8.9984E−07 |
| A14 = | — | 2.9730E−01 | 5.8896E−02 | 1.2247E−04 | −1.4829E−05 |
| A16 = | — | −1.0205E−01 | −4.4740E−03 | −2.5039E−05 | 1.7214E−06 |

In the optical imaging lens assembly according to the 2nd embodiment, the definitions of these parameters shown in the following table are the same as those stated in the 1st embodiment with corresponding values for the 2nd embodiment. Moreover, these parameters can be calculated from Table 3 and Table 4 as the following values and satisfy the following conditions:

| 2nd Embodiment | | | |
|---|---|---|---|
| f [mm] | 2.63 | R8/f | −0.39 |
| Fno | 2.30 | f1/f2 | 0.16 |
| HFOV [deg.] | 43.9 | f4/f1 | 1.40 |
| V5 | 23.3 | SAG42 + CT4 [mm] | −0.13 |
| (V2 + V4 + V5)/(V1 + V3) | 0.65 | TTL/ImgH | 1.51 |
| T23/T12 | 0.26 | | |

3rd Embodiment

Figure 5:
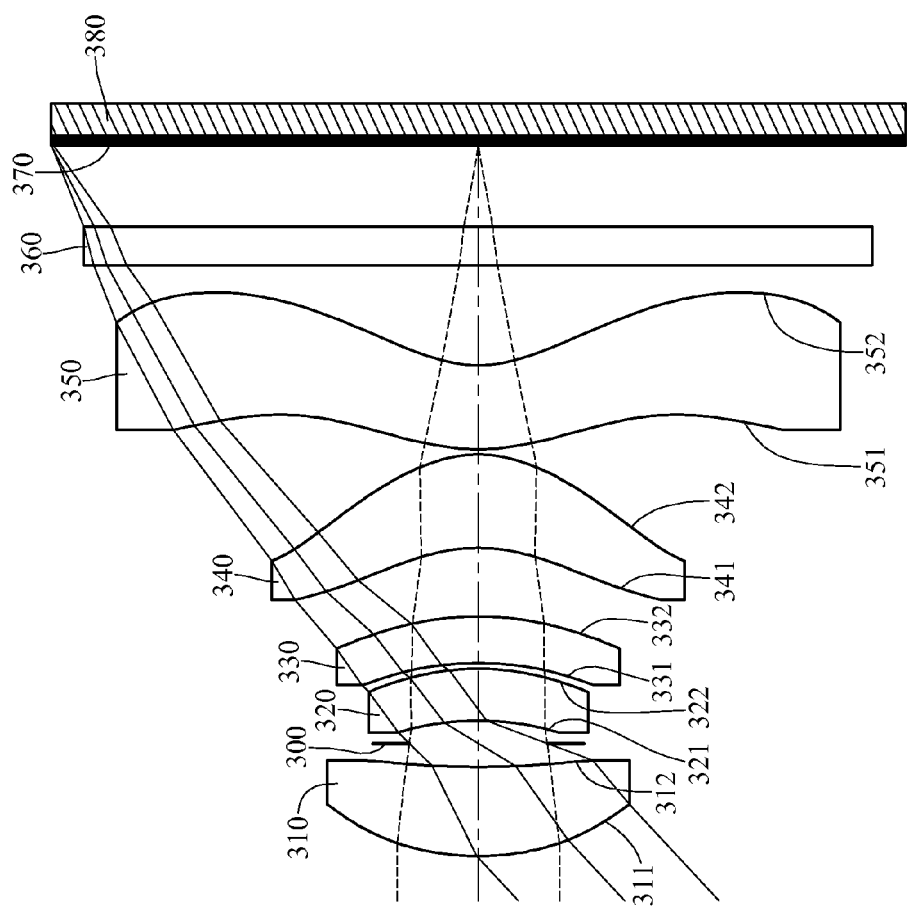
FIG. 5 is a schematic view of an optical imaging device according to the 3rd embodiment of the present disclosure.
Figure 6:
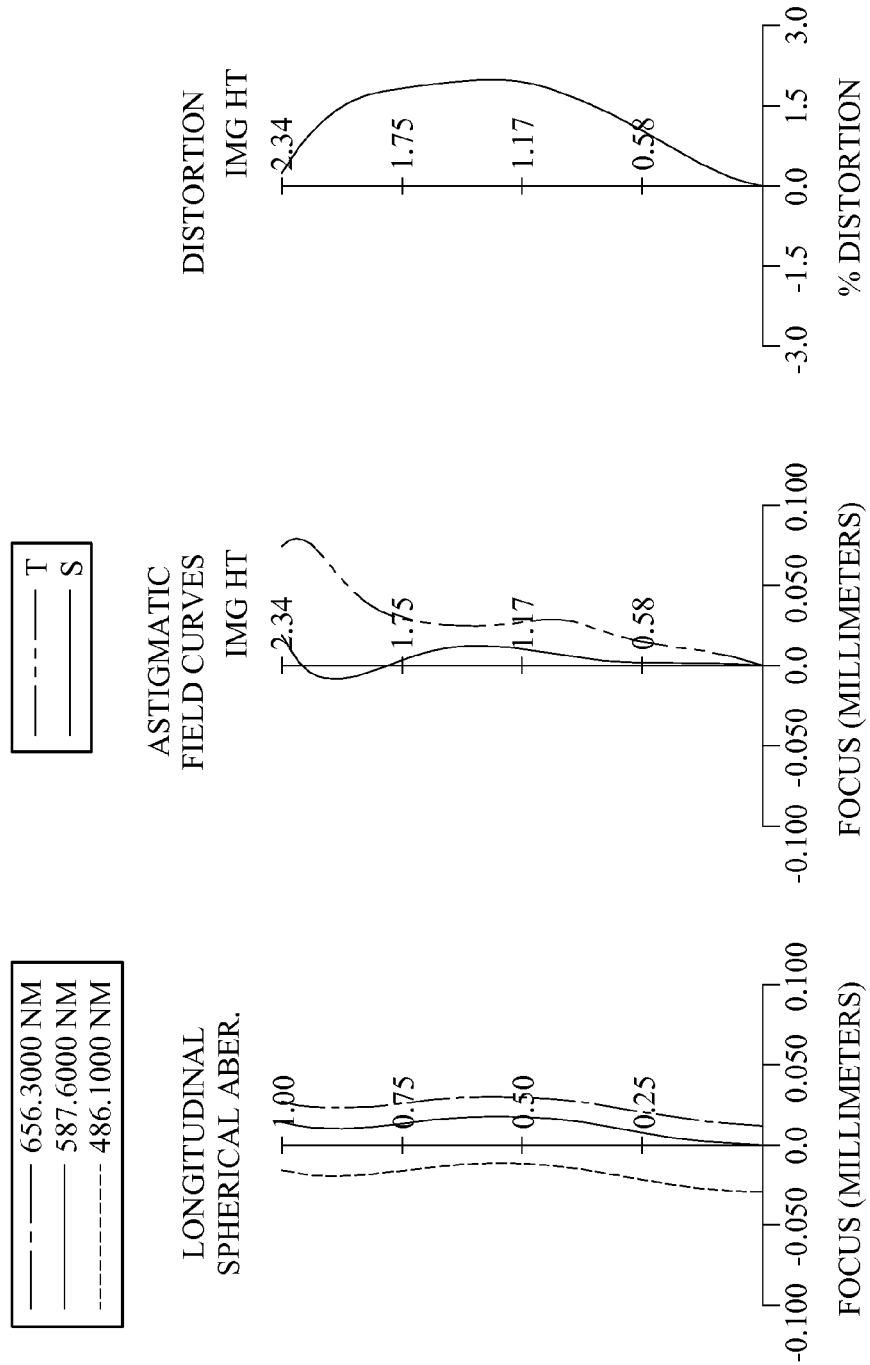
FIG. 6 shows spherical aberration curves, astigmatic field curves and a distortion curve of the optical imaging device according to the 3rd embodiment.

FIG. 5 is a schematic view of an optical imaging device according to the 3rd embodiment of the present disclosure. FIG. 6 shows, in order from left to right, spherical aberration curves, astigmatic field curves and a distortion curve of the optical imaging device according to the 3rd embodiment.

In FIG. 5, the optical imaging device includes the optical imaging lens assembly (not otherwise herein labeled) of the present disclosure and an image sensor 380. The optical imaging lens assembly includes, in order from an object side to an image side, a first lens element 310, an aperture stop 300, a second lens element 320, a third lens element 330, a fourth lens element 340, a fifth lens element 350, an IR-cut filter 360 and an image plane 370, wherein the optical imaging lens assembly has a total of five lens elements (310-350) with refractive power.

The first lens element 310 with positive refractive power has a convex object-side surface 311 and a concave image-side surface 312, which are both aspheric, and the first lens element 310 is made of plastic material.

The second lens element 320 with positive refractive power has a concave object-side surface 321 and a convex image-side surface 322, which are both aspheric, and the second lens element 320 is made of plastic material.

The third lens element 330 with positive refractive power has a concave object-side surface 331 and a convex image-side surface 332, which are both aspheric, and the third lens element 330 is made of plastic material.

The fourth lens element 340 with positive refractive power has a concave object-side surface 341 and a convex image-side surface 342, which are both aspheric, and the fourth lens element 340 is made of plastic material.

The fifth lens element 350 with negative refractive power has a convex object-side surface 351 and a concave image-side surface 352, which are both aspheric, and the fifth lens element 350 is made of plastic material. Specifically, the fifth lens element 350 has a concave image-side surface 352 in a paraxial region thereof, wherein the image-side surface 352 of the fifth lens element 350 has at least one convex shape in an off-axis region thereof.

The IR-cut filter 360 is made of glass and located between the fifth lens element 350 and the image plane 370, and will not affect the focal length of the optical imaging lens assembly. The image sensor 380 is disposed on the image plane 370 of the optical imaging lens assembly.

The detailed optical data of the 3rd embodiment are shown in Table 5 and the aspheric surface data are shown in Table 6 below.

TABLE 5

3rd Embodiment
f = 2.49 mm, Fno = 2.80, HFOV = 43.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.457 | ASP | 0.489 | Plastic | 1.535 | 56.3 | 3.67 |
| 2 | | 4.994 | ASP | 0.129 | | | | |
| 3 | Ape. Stop | Plano | | 0.124 | | | | |
| 4 | Lens 2 | −1.603 | ASP | 0.286 | Plastic | 1.530 | 55.8 | 10.35 |
| 5 | | −1.317 | ASP | 0.030 | | | | |
| 6 | Lens 3 | −1.828 | ASP | 0.255 | Plastic | 1.544 | 55.9 | 125.27 |
| 7 | | −1.868 | ASP | 0.377 | | | | |
| 8 | Lens 4 | −0.937 | ASP | 0.511 | Plastic | 1.535 | 56.3 | 3.12 |
| 9 | | −0.713 | ASP | 0.030 | | | | |
| 10 | Lens 5 | 1.208 | ASP | 0.460 | Plastic | 1.543 | 56.5 | −4.18 |
| 11 | | 0.683 | ASP | 0.550 | | | | |

TABLE 5-continued

3rd Embodiment
f = 2.49 mm, Fno = 2.80, HFOV = 43.1 deg.

| Surface # | | Curvature Radius | Thickness | Material | Index | Abbe # | Focal Length |
|---|---|---|---|---|---|---|---|
| 12 | IR-cut filter | Plano | 0.210 | Glass | 1.517 | 64.2 | — |
| 13 | | Plano | 0.444 | | | | |
| 14 | Image | Plano | — | | | | |

Note:
Reference wavelength is 587.6 nm (d-line).

TABLE 6

Aspheric Coefficients

| Surface # | 1 | 2 | 4 | 5 | 6 |
|---|---|---|---|---|---|
| k = | 9.7780E−01 | −1.1596E+00 | −1.0141E+01 | −9.0299E+00 | −2.2525E−01 |
| A4 = | −4.0122E−03 | 1.0049E−01 | −3.2919E−01 | −2.4063E−01 | −1.3806E−01 |
| A6 = | 1.0242E−01 | −5.5145E−01 | 4.6193E−01 | 3.6924E−01 | 1.9790E−01 |
| A8 = | −2.5968E−01 | 1.7246E+00 | −4.5979E+00 | −1.0499E+00 | 1.0913E−01 |
| A10 = | 1.4186E−01 | −4.8721E+00 | 1.0211E+01 | 1.5997E+00 | −2.0316E−01 |
| A12 = | 5.1578E−01 | 6.6521E+00 | −1.4236E+01 | −1.3744E+00 | 2.8623E−01 |
| A14 = | −8.4205E−01 | −3.7821E+00 | 7.8660E+00 | 5.3086E−01 | −6.4012E−02 |

| Surface # | 7 | 8 | 9 | 10 | 11 |
|---|---|---|---|---|---|
| k = | −1.2112E+01 | −4.9779E+00 | −2.9450E+00 | −2.4702E+00 | −3.4152E+00 |
| A4 = | −4.6796E−01 | −3.3974E−01 | −3.6551E−01 | −2.1517E−01 | −1.2018E−01 |
| A6 = | 1.0109E+00 | 1.2238E+00 | 6.7104E−01 | 6.9679E−02 | 4.1493E−02 |
| A8 = | −1.0761E+00 | −1.7491E+00 | −7.7715E−01 | −1.2351E−02 | −9.7807E−03 |
| A10 = | 4.5082E−01 | 1.4656E+00 | 6.0636E−01 | 2.8121E−03 | 1.1936E−03 |
| A12 = | −5.3561E−02 | −7.8852E−01 | −2.6553E−01 | −8.0906E−04 | −2.5404E−05 |
| A14 = | — | 2.6809E−01 | 6.0210E−02 | 1.3292E−04 | −1.2871E−05 |
| A16 = | — | −4.5768E−02 | −5.0180E−03 | −9.3371E−06 | 7.4377E−07 |

In the optical imaging lens assembly according to the 3rd embodiment, the definitions of these parameters shown in the following table are the same as those stated in the 1st embodiment with corresponding values for the 3rd embodiment. Moreover, these parameters can be calculated from Table 5 and Table 6 as the following values and satisfy the following conditions:

| 3rd Embodiment | | | |
|---|---|---|---|
| f [mm] | 2.49 | R8/f | −0.29 |
| Fno | 2.80 | f1/f2 | 0.35 |
| HFOV [deg.] | 43.1 | f4/f1 | 0.85 |
| V5 | 56.6 | SAG42 + CT4 [mm] | −0.07 |
| (V2 + V4 + V5)/(V1 + V3) | 1.50 | TTL/ImgH | 1.63 |
| T23/T12 | 0.12 | | |

4th Embodiment

Figure 7:
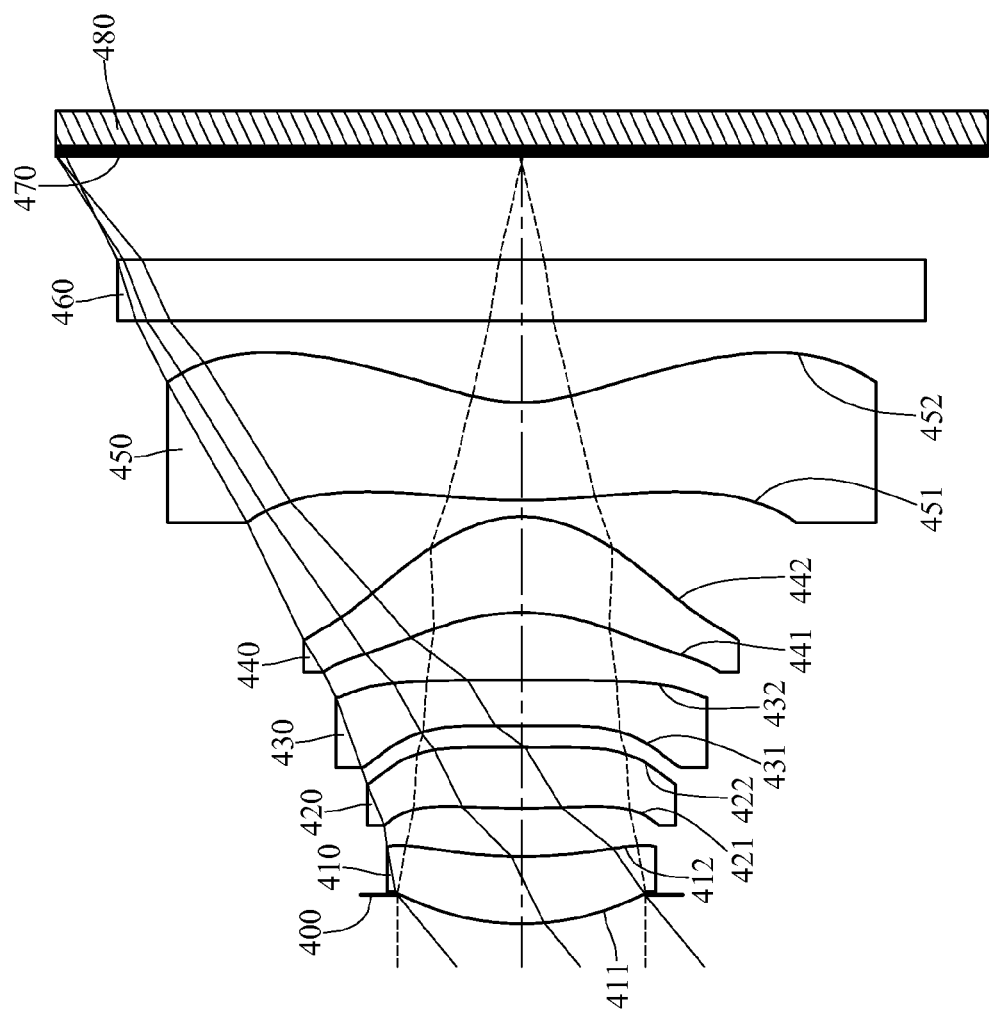
FIG. 7 is a schematic view of an optical imaging device according to the 4th embodiment of the present disclosure.
Figure 8:
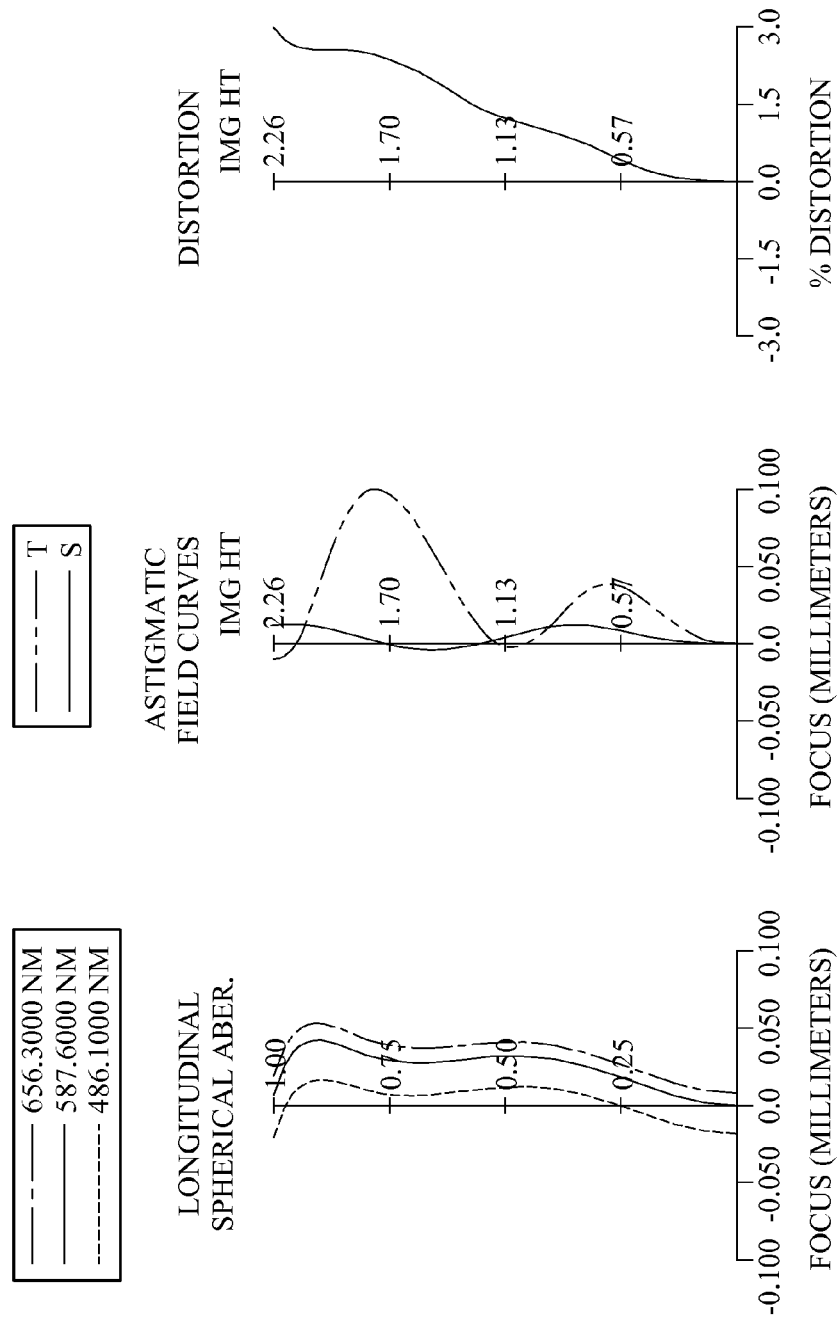
FIG. 8 shows spherical aberration curves, astigmatic field curves and a distortion curve of the optical imaging device according to the 4th embodiment.

FIG. 7 is a schematic view of an optical imaging device according to the 4th embodiment of the present disclosure. FIG. 8 shows, in order from left to right, spherical aberration curves, astigmatic field curves and a distortion curve of the optical imaging device according to the 4th embodiment.

In FIG. 7, the optical imaging device includes the optical imaging lens assembly (not otherwise herein labeled) of the present disclosure and an image sensor 480. The optical imaging lens assembly includes, in order from an object side to an image side, an aperture stop 400, a first lens element 410, a second lens element 420, a third lens element 430, a fourth lens element 440, a fifth lens element 450, an IR-cut filter 460 and an image plane 470, wherein the optical imaging lens assembly has a total of five lens elements (410-450) with refractive power.

The first lens element 410 with positive refractive power has a convex object-side surface 411 and a concave image-side surface 412, which are both aspheric, and the first lens element 410 is made of plastic material.

The second lens element 420 with positive refractive power has a convex object-side surface 421 and a concave image-side surface 422, which are both aspheric, and the second lens element 420 is made of plastic material.

The third lens element 430 with positive refractive power has a convex object-side surface 431 and a convex image-side surface 432, which are both aspheric, and the third lens element 430 is made of plastic material.

The fourth lens element 440 with positive refractive power has a concave object-side surface 441 and a convex image-side surface 442, which are both aspheric, and the fourth lens element 440 is made of plastic material.

The fifth lens element 450 with negative refractive power has a convex object-side surface 4451 and a concave image-side surface 452, which are both aspheric, and the fifth lens element 450 is made of plastic material. Specifically, the fifth lens element 450 has a concave image-side surface 452 in a paraxial region thereof, wherein the image-side surface 452 of the fifth lens element 450 has at least one convex shape in an off-axis region thereof.

The IR-cut filter 460 is made of glass and located between the fifth lens element 450 and the image plane 470, and will not affect the focal length of the optical imaging lens assembly. The image sensor 480 is disposed on the image plane 470 of the optical imaging lens assembly.

The detailed optical data of the 4th embodiment are shown in Table 7 and the aspheric surface data are shown in Table 8 below.

TABLE 7

4th Embodiment
f = 2.66 mm, Fno = 2.20, HFOV = 39.3 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.140 | | | | |
| 2 | Lens 1 | 1.279 ASP | 0.328 | Plastic | 1.544 | 55.9 | 4.86 |
| 3 | | 2.253 ASP | 0.236 | | | | |
| 4 | Lens 2 | 4.645 ASP | 0.296 | Plastic | 1.544 | 55.9 | 15.65 |
| 5 | | 9.988 ASP | 0.107 | | | | |
| 6 | Lens 3 | 25.753 ASP | 0.222 | Plastic | 1.543 | 56.5 | 34.46 |
| 7 | | −68.397 ASP | 0.330 | | | | |
| 8 | Lens 4 | −1.110 ASP | 0.469 | Plastic | 1.535 | 55.7 | 1.82 |
| 9 | | −0.595 ASP | 0.080 | | | | |
| 10 | Lens 5 | 2.776 ASP | 0.477 | Plastic | 1.634 | 23.8 | −1.93 |
| 11 | | 0.792 ASP | 0.400 | | | | |
| 12 | IR-cut filter | Plano | 0.300 | Glass | 1.517 | 64.2 | — |
| 13 | | Plano | 0.500 | | | | |
| 14 | Image | Plano | — | | | | |

Note:
Reference wavelength is 587.6 nm (d-line).

TABLE 8

Aspheric Coefficients

| Surface # | 2 | 3 | 4 | 5 | 6 |
|---|---|---|---|---|---|
| k = | −7.1821E+00 | 1.0265E+00 | −9.1396E+00 | 2.0000E+00 | 2.0000E+00 |
| A4 = | 3.9889E−01 | −8.1548E−02 | −3.6646E−01 | −6.6684E−01 | −5.3606E−01 |
| A6 = | −5.0708E−01 | −3.5305E−01 | 1.9921E+00 | 5.8616E−01 | −5.9357E−01 |
| A8 = | 6.7577E−01 | 3.0859E−01 | −2.1035E+00 | −2.8640E+00 | 8.7171E−01 |
| A10 = | −7.4494E−01 | −2.6797E−01 | −1.0270E+00 | 2.6962E+00 | −1.8701E+00 |
| A12 = | −1.9498E−01 | −2.8897E+00 | 4.7506E+00 | −3.1251E−01 | 2.4161E+00 |
| A14 = | 1.3416E−01 | 1.1015E+00 | −3.0842E+00 | 2.5124E+00 | 9.6405E−01 |
| A16 = | — | — | 2.6001E−08 | 2.2773E−01 | — |

| Surface # | 7 | 8 | 9 | 10 | 11 |
|---|---|---|---|---|---|
| k = | 2.0000E+00 | −1.1616E+00 | −2.6718E+00 | 2.2082E−01 | −6.0658E+00 |
| A4 = | 6.0740E−02 | −1.1345E−02 | −5.2487E−01 | −2.8418E−01 | −1.7122E−01 |
| A6 = | −1.3490E+00 | 4.6987E−01 | 9.6823E−01 | 2.3537E−01 | 1.4653E−01 |
| A8 = | 6.4385E+00 | −1.5237E−01 | −1.5015E+00 | −1.7646E−01 | −9.0667E−02 |
| A10 = | −1.7937E+01 | −3.1326E−01 | 1.8957E+00 | 8.2748E−02 | 3.3076E−02 |
| A12 = | 2.9191E+01 | 1.9599E−01 | −1.0813E+00 | −2.3562E−02 | −6.7279E−03 |
| A14 = | −2.6324E+01 | −7.4406E−02 | 1.7475E−01 | 2.8993E−03 | 5.7796E−04 |
| A16 = | 1.0034E+01 | — | — | — | — |

In the optical imaging lens assembly according to the 4th embodiment, the definitions of these parameters shown in the following table are the same as those stated in the 1st embodiment with corresponding values for the 4th embodiment. Moreover, these parameters can be calculated from Table 7 and Table 8 as the following values and satisfy the following conditions:

| 4th Embodiment | | | |
|---|---|---|---|
| f [mm] | 2.66 | R8/f | −0.22 |
| Fno | 2.20 | f1/f2 | 0.31 |
| HFOV [deg.] | 39.3 | f4/f1 | 0.37 |
| V5 | 23.8 | SAG42 + CT4 [mm] | −0.14 |
| (V2 + V4 + V5)/(V1 + V3) | 1.20 | TTL/ImgH | 1.61 |
| T23/T12 | 0.45 | | |

5th Embodiment

Figure 9:
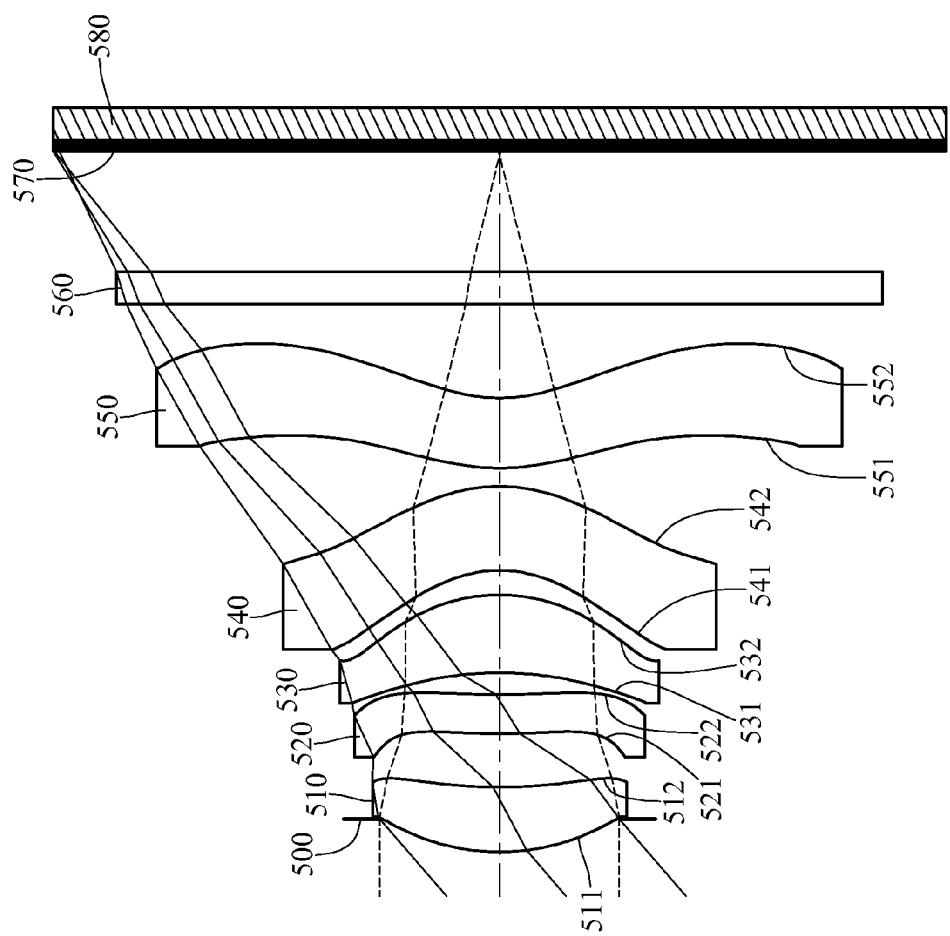
FIG. 9 is a schematic view of an optical imaging device according to the 5th embodiment of the present disclosure.
Figure 10:
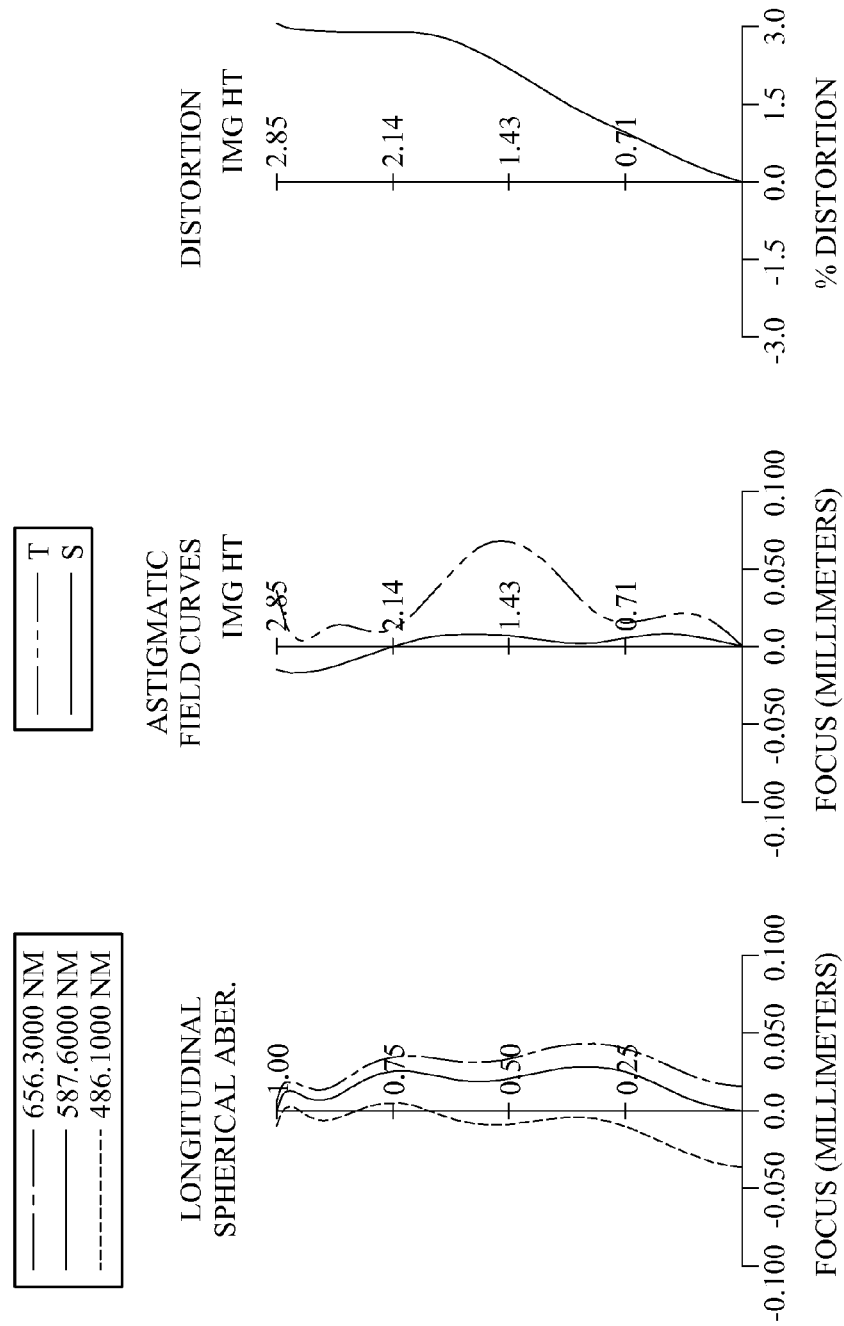
FIG. 10 shows spherical aberration curves, astigmatic field curves and a distortion curve of the optical imaging device according to the 5th embodiment.

FIG. 9 is a schematic view of an optical imaging device according to the 5th embodiment of the present disclosure. FIG. 10 shows, in order from left to right, spherical aberration curves, astigmatic field curves and a distortion curve of the optical imaging device according to the 5th embodiment.

In FIG. 9, the optical imaging device includes the optical imaging lens assembly (not otherwise herein labeled) of the present disclosure and an image sensor 580. The optical imaging lens assembly includes, in order from an object side to an image side, an aperture stop 500, a first lens element 510, a second lens element 520, a third lens element 530, a fourth lens element 540, a fifth lens element 550, an IR-cut filter 560 and an image plane 570, wherein the optical imaging lens assembly has a total of five lens elements (510-550) with refractive power.

The first lens element 510 with positive refractive power has a convex object-side surface 511 and a concave image-side surface 512, which are both aspheric, and the first lens element 510 is made of plastic material.

The second lens element 520 with positive refractive power has a convex object-side surface 521 and a concave image-side surface 522, which are both aspheric, and the second lens element 520 is made of plastic material.

The third lens element 530 with positive refractive power has a concave object-side surface 531 and a convex image-side surface 532, which are both aspheric, and the third lens element 530 is made of plastic material.

The fourth lens element 540 with positive refractive power has a concave object-side surface 541 and a convex image-side surface 542, which are both aspheric, and the fourth lens element 540 is made of plastic material.

The fifth lens element 550 with negative refractive power has a convex object-side surface 551 and a concave image-side surface 552, which are both aspheric, and the fifth lens element 550 is made of plastic material. Specifically, the fifth lens element 550 has a concave image-side surface 552 in a paraxial region thereof, wherein the image-side surface 552 of the fifth lens element 550 has at least one convex shape in an off-axis region thereof.

The IR-cut filter 560 is made of glass and located between the fifth lens element 550 and the image plane 570, and will not affect the focal length of the optical imaging lens assembly. The image sensor 580 is disposed on the image plane 570 of the optical imaging lens assembly.

The detailed optical data of the 5th embodiment are shown in Table 9 and the aspheric surface data are shown in Table 10 below.

TABLE 9

5th Embodiment
f = 3.22 mm, Fno = 2.10, HFOV = 40.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.213 | | | | |
| 2 | Lens 1 | 1.430 | ASP | 0.414 | Plastic | 1.544 | 55.9 | 4.58 |
| 3 | | 3.007 | ASP | 0.343 | | | | |
| 4 | Lens 2 | 4.293 | ASP | 0.250 | Plastic | 1.634 | 23.8 | 25.38 |
| 5 | | 5.722 | ASP | 0.138 | | | | |
| 6 | Lens 3 | −2.601 | ASP | 0.500 | Plastic | 1.544 | 55.9 | 3.88 |
| 7 | | −1.243 | ASP | 0.157 | | | | |
| 8 | Lens 4 | −0.839 | ASP | 0.540 | Plastic | 1.640 | 23.3 | 116.52 |
| 9 | | −1.038 | ASP | 0.117 | | | | |
| 10 | Lens 5 | 1.468 | ASP | 0.448 | Plastic | 1.650 | 21.4 | −8.04 |
| 11 | | 1.008 | ASP | 0.600 | | | | |
| 12 | IR-cut filter | Plano | | 0.210 | Glass | 1.517 | 64.2 | — |
| 13 | | Plano | | 0.772 | | | | |
| 14 | Image | Plano | | — | | | | |

Note:
Reference wavelength is 587.6 nm (d-line).

TABLE 10

Aspheric Coefficients

| Surface # | 2 | 3 | 4 | 5 | 6 |
|---|---|---|---|---|---|
| k = | 2.9191E−01 | −2.7248E+01 | −2.7408E+00 | −1.4752E+00 | 2.2418E−01 |
| A4 = | −1.0268E−02 | 9.8190E−02 | −2.6001E−01 | −1.6676E−01 | −1.5799E−01 |
| A6 = | 7.7860E−02 | −4.3027E−01 | 5.5249E−01 | 2.1798E−01 | 2.2920E−01 |
| A8 = | −2.9581E−01 | 1.5901E+00 | −4.0867E+00 | −1.0712E+00 | 1.1909E−01 |
| A10 = | 1.9299E−01 | −4.8871E+00 | 9.8799E+00 | 1.6039E+00 | −3.6339E−01 |
| A12 = | 5.1214E−01 | 6.6490E+00 | −1.4236E+01 | −1.4345E+00 | 2.0871E−01 |
| A14 = | −8.4253E−01 | −3.7835E+00 | 7.8660E+00 | 5.4309E−01 | −6.4012E−02 |

| Surface # | 7 | 8 | 9 | 10 | 11 |
|---|---|---|---|---|---|
| k = | −2.9617E+00 | −1.8209E+00 | −5.0260E+00 | −1.3079E+00 | −3.6812E+00 |
| A4 = | −5.4586E−01 | −3.7029E−01 | −3.3753E−01 | −1.9731E−01 | −9.9180E−02 |
| A6 = | 9.6516E−01 | 1.1939E+00 | 6.6930E−01 | 6.4290E−02 | 3.5302E−02 |
| A8 = | −1.0607E+00 | −1.7464E+00 | −7.8443E−01 | −1.3588E−02 | −8.9742E−03 |
| A10 = | 5.1600E−01 | 1.4745E+00 | 6.0246E−01 | 2.8947E−03 | 1.2172E−03 |
| A12 = | 2.3522E−02 | −7.7712E−01 | −2.6691E−01 | −7.2038E−04 | −1.7152E−05 |
| A14 = | — | 2.8403E−01 | 5.9974E−02 | 1.3265E−04 | −1.4513E−05 |
| A16 = | — | −5.2235E−02 | −5.2548E−03 | −1.1835E−05 | 9.8705E−07 |

In the optical imaging lens assembly according to the 5th embodiment, the definitions of these parameters shown in the following table are the same as those stated in the 1st embodiment with corresponding values for the 5th embodiment. Moreover, these parameters can be calculated from Table 9 and Table 10 as the following values and satisfy the following conditions:

| 5th Embodiment | | | |
|---|---|---|---|
| f [mm] | 3.22 | R8/f | −0.32 |
| Fno | 2.10 | f1/f2 | 0.18 |
| HFOV [deg.] | 40.6 | f4/f1 | 25.42 |
| V5 | 21.4 | SAG42 + CT4 [mm] | 0.04 |
| (V2 + V4 + V5)/(V1 + V3) | 0.61 | TTL/ImgH | 1.55 |
| T23/T12 | 0.40 | | |

6th Embodiment

Figure 11:
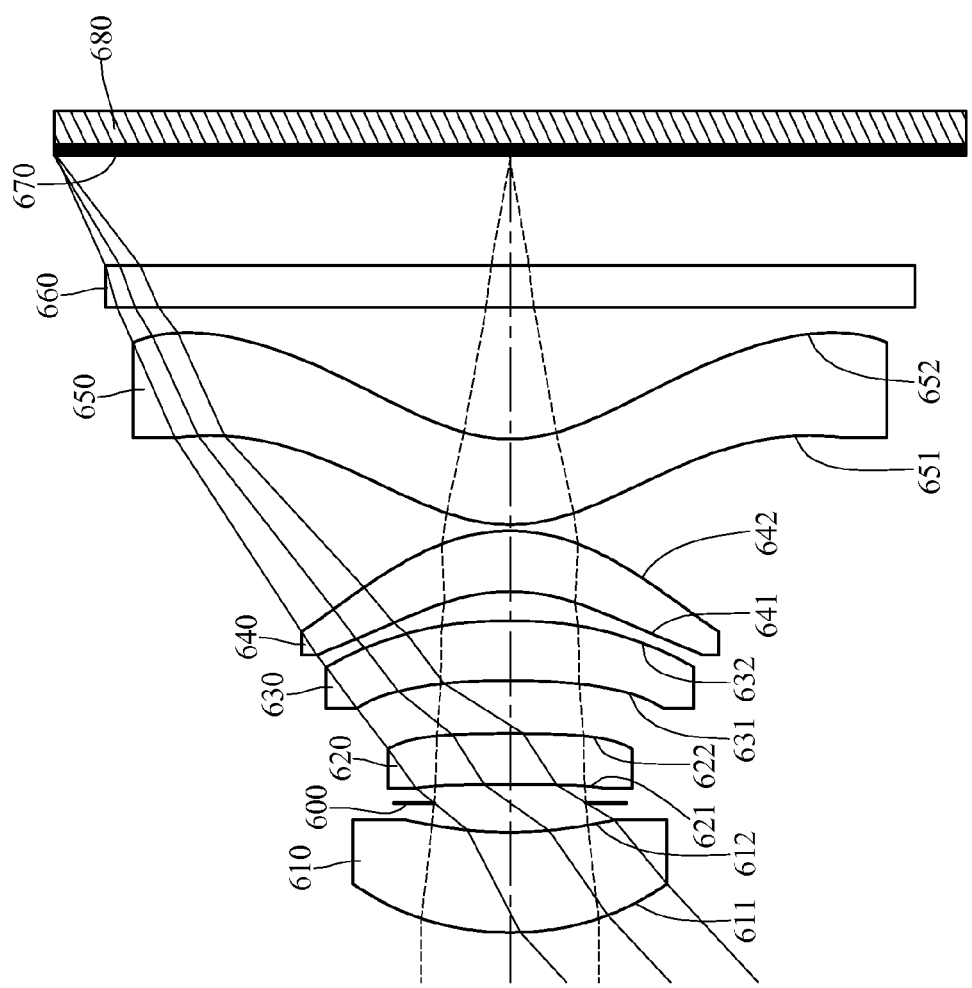
FIG. 11 is a schematic view of an optical imaging device according to the 6th embodiment of the present disclosure.
Figure 12:
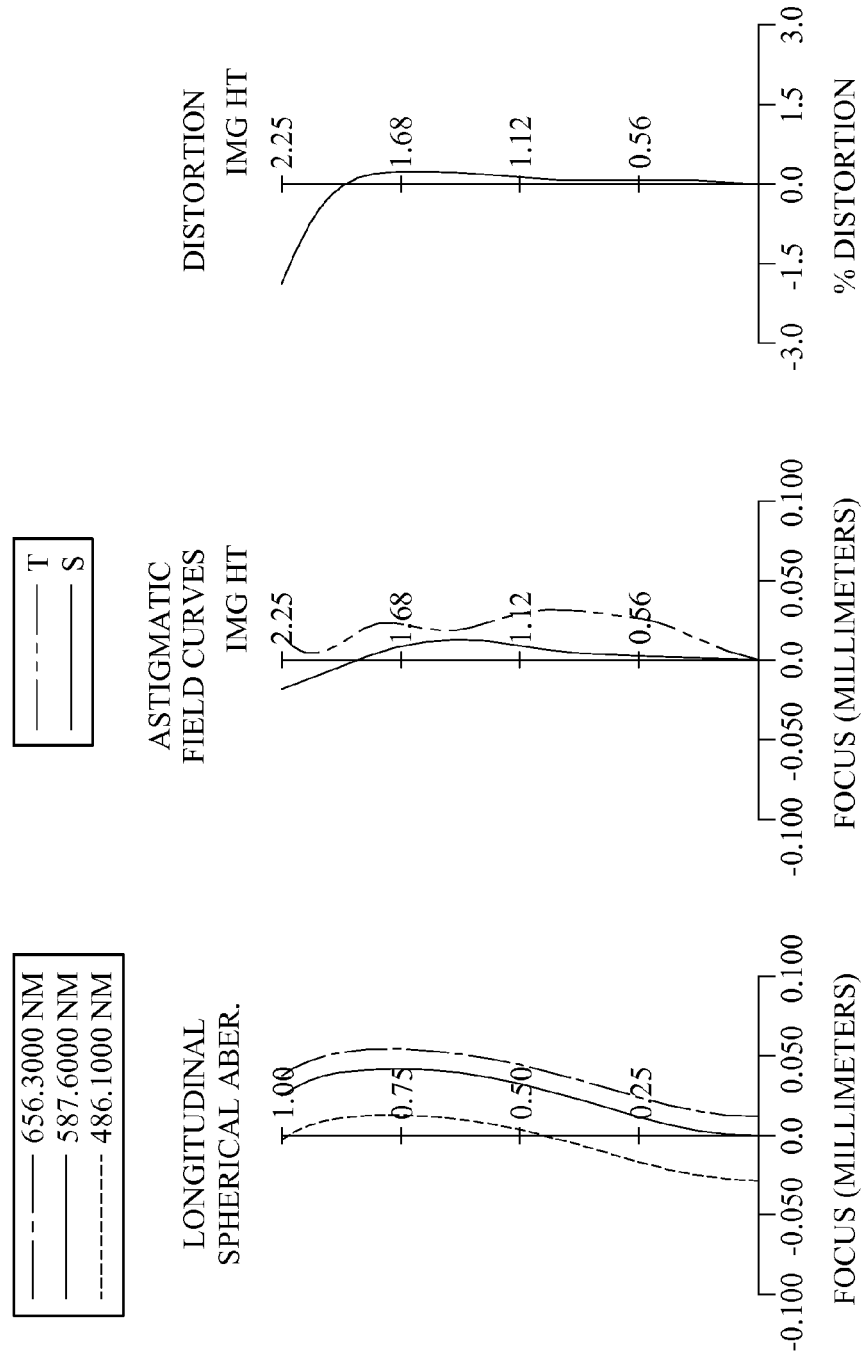
FIG. 12 shows spherical aberration curves, astigmatic field curves and a distortion curve of the optical imaging device according to the 6th embodiment.

FIG. 11 is a schematic view of an optical imaging device according to the 6th embodiment of the present disclosure. FIG. 12 shows, in order from left to right, spherical aberration curves, astigmatic field curves and a distortion curve of the optical imaging device according to the 6th embodiment.

In FIG. 11, the optical imaging device includes the optical imaging lens assembly (not otherwise herein labeled) of the present disclosure and an image sensor 680. The optical imaging lens assembly includes, in order from an object side to an image side, a first lens element 610, an aperture stop 600, a second lens element 620, a third lens element 630, a fourth lens element 640, a fifth lens element 650, an IR-cut filter 660 and an image plane 670, wherein the optical imaging lens assembly has a total of five lens elements (610-650) with refractive power.

The first lens element 610 with positive refractive power has a convex object-side surface 611 and a concave image-side surface 612, which are both aspheric, and the first lens element 610 is made of plastic material.

The second lens element 620 with positive refractive power has a convex object-side surface 621 and a convex image-side surface 622, which are both aspheric, and the second lens element 620 is made of plastic material.

The third lens element 630 with positive refractive power has a concave object-side surface 631 and a convex image-side surface 632, which are both aspheric, and the third lens element 630 is made of plastic material.

The fourth lens element 640 with positive refractive power has a concave object-side surface 641 and a convex image-side surface 642, which are both aspheric, and the fourth lens element 640 is made of plastic material.

The fifth lens element 650 with positive refractive power has a convex object-side surface 651 and a concave image-side surface 652, which are both aspheric, and the fifth lens element 650 is made of plastic material. Specifically, the fifth lens element 650 has a concave image-side surface 652 in a paraxial region thereof, wherein the image-side surface 652 of the fifth lens element 650 has at least one convex shape in an off-axis region thereof.

The IR-cut filter 660 is made of glass and located between the fifth lens element 650 and the image plane 670, and will not affect the focal length of the optical imaging lens assembly. The image sensor 680 is disposed on the image plane 670 of the optical imaging lens assembly.

The detailed optical data of the 6th embodiment are shown in Table 11 and the aspheric surface data are shown in Table 12 below.

TABLE 11

6th Embodiment
f = 2.45 mm, Fno = 2.80, HFOV = 42.8 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 1.445 ASP | 0.496 | Plastic | 1.535 | 56.3 | 6.47 |
| 2 | | 2.184 ASP | 0.145 | | | | |
| 3 | Ape. Stop | Plano | 0.090 | | | | |
| 4 | Lens 2 | 939.557 ASP | 0.252 | Plastic | 1.530 | 55.8 | 16.44 |
| 5 | | −8.795 ASP | 0.263 | | | | |
| 6 | Lens 3 | −3.812 ASP | 0.294 | Plastic | 1.544 | 55.9 | 19.38 |
| 7 | | −2.876 ASP | 0.145 | | | | |
| 8 | Lens 4 | −0.899 ASP | 0.300 | Plastic | 1.543 | 56.5 | 8.98 |
| 9 | | −0.848 ASP | 0.030 | | | | |
| 10 | Lens 5 | 0.796 ASP | 0.422 | Plastic | 1.543 | 56.5 | 11.31 |
| 11 | | 0.744 ASP | 0.650 | | | | |
| 12 | IR-cut filter | Plano | 0.210 | Glass | 1.517 | 64.2 | — |
| 13 | | Plano | 0.540 | | | | |
| 14 | Image | Plano | — | | | | |

Note:
Reference wavelength is 587.6 nm (d-line).

TABLE 12

| Aspheric Coefficients | | | | | |
|---|---|---|---|---|---|
| Surface # | 1 | 2 | 4 | 5 | 6 |
| k = | 9.9285E−01 | −1.5661E−01 | 1.0000E+00 | −3.0158E−01 | −1.5297E+00 |
| A4 = | −1.1419E−02 | 1.0490E−01 | −3.0849E−01 | −2.2632E−01 | −1.9040E−01 |
| A6 = | 7.4390E−02 | −6.5022E−01 | 2.0350E−01 | 3.6096E−02 | 1.5980E−01 |
| A8 = | −2.7391E−01 | 1.9882E+00 | −6.7124E+00 | −1.5438E+00 | 2.8911E−03 |
| A10 = | 1.6137E−01 | −6.5932E+00 | 1.8098E+01 | 1.9133E−01 | −6.4853E−01 |

TABLE 12-continued

| Aspheric Coefficients | | | | | |
|---|---|---|---|---|---|
| A12 = | 5.0319E−01 | 6.6491E+00 | −1.4236E+01 | −1.3776E+00 | 2.6780E−01 |
| A14 = | −8.4357E−01 | −3.7835E+00 | 7.8660E+00 | 5.3088E−01 | −7.9556E−02 |

| Surface # | 7 | 8 | 9 | 10 | 11 |
|---|---|---|---|---|---|
| k = | −1.0000E+00 | −4.1674E+00 | −3.1454E+00 | −2.0637E+00 | −2.3214E+00 |
| A4 = | −4.7016E−01 | −3.4441E−01 | −3.6649E−01 | −1.7194E−01 | −1.2264E−01 |
| A6 = | 1.0128E+00 | 1.2178E+00 | 6.6671E−01 | 6.0695E−02 | 4.0941E−02 |
| A8 = | −1.0695E+00 | −1.7562E+00 | −7.7979E−01 | −1.4436E−02 | −9.0161E−03 |
| A10 = | 4.6012E−01 | 1.4590E+00 | 6.0531E−01 | 2.7844E−03 | 1.0386E−03 |
| A12 = | −5.4674E−02 | −7.9159E−01 | −2.6602E−01 | −7.3737E−04 | −6.2155E−05 |
| A14 = | — | 2.6974E−01 | 5.9878E−02 | 1.5355E−04 | −9.5482E−06 |
| A16 = | — | −4.2103E−02 | −5.4374E−03 | −1.0794E−05 | 1.9671E−06 |

In the optical imaging lens assembly according to the 6th embodiment, the definitions of these parameters shown in the following table are the same as those stated in the 1st embodiment with corresponding values for the 6th embodiment. Moreover, these parameters can be calculated from Table 11 and Table 12 as the following values and satisfy the following conditions:

| 6th Embodiment | | | |
|---|---|---|---|
| f [mm] | 2.45 | R8/f | −0.35 |
| Fno | 2.80 | f1/f2 | 0.39 |
| HFOV [deg.] | 42.8 | f4/f1 | 1.39 |
| V5 | 56.5 | SAG42 + CT4 [mm] | −0.20 |
| (V2 + V4 + V5)/(V1 + V3) | 1.50 | TTL/ImgH | 1.67 |
| T23/T12 | 1.12 | | |

7th Embodiment

Figure 13:
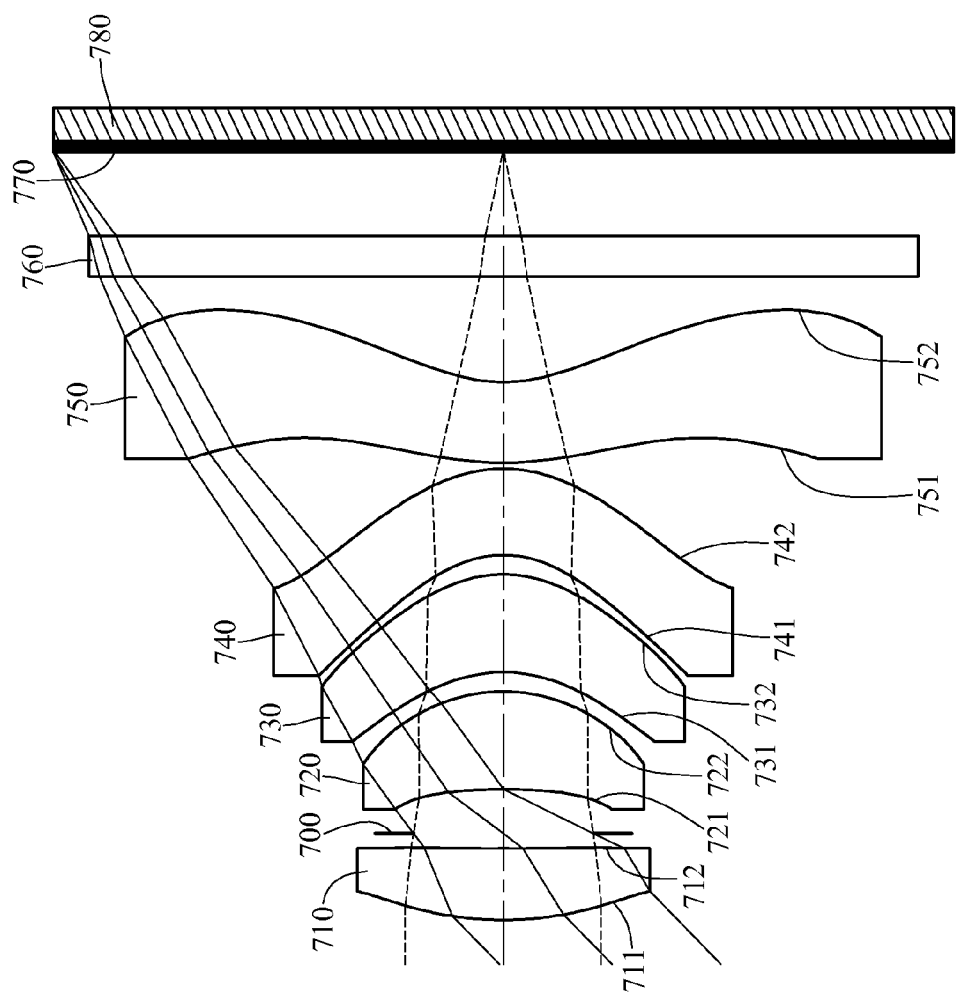
FIG. 13 is a schematic view of an optical imaging device according to the 7th embodiment of the present disclosure.
Figure 14:
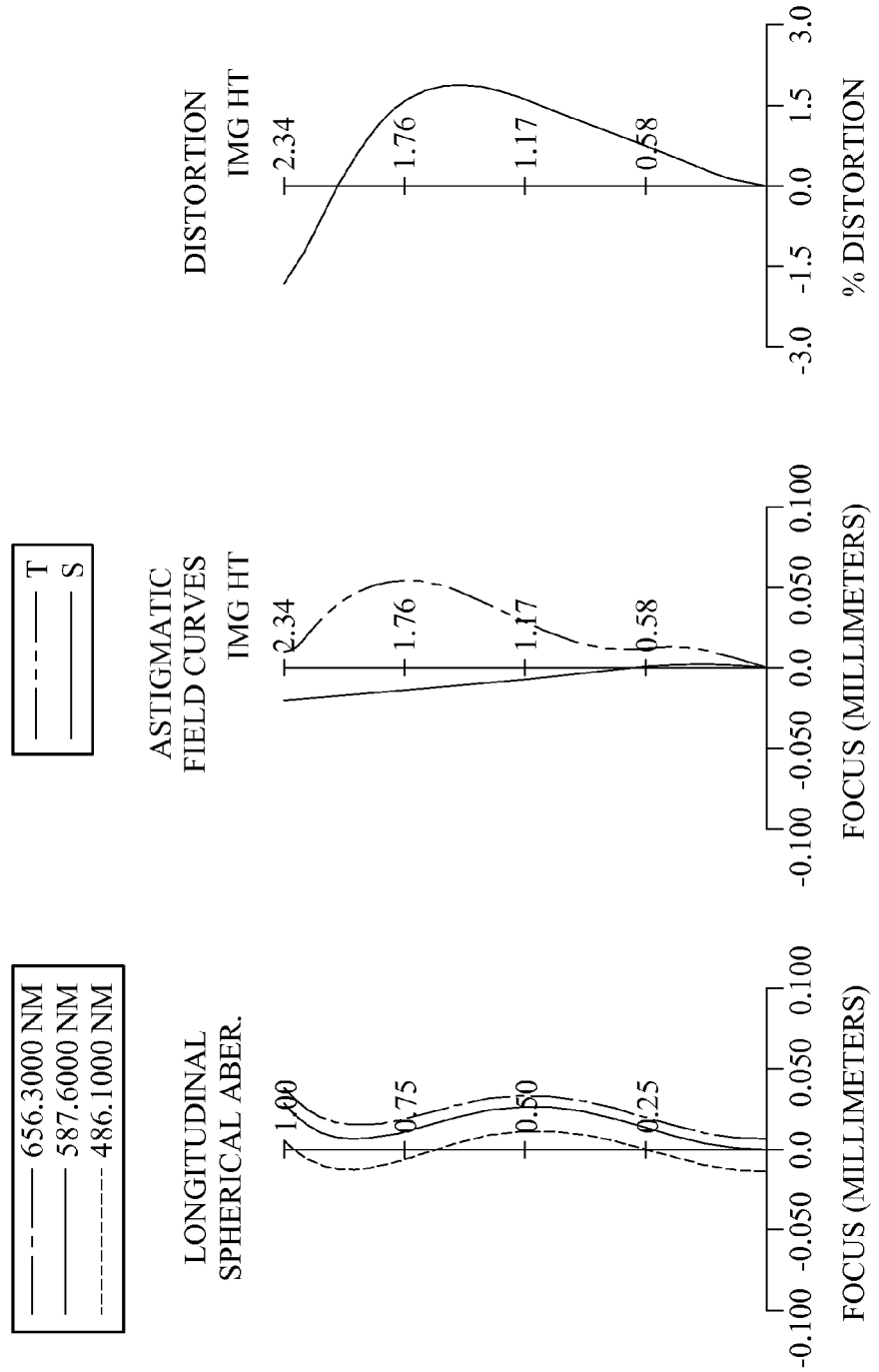
FIG. 14 shows spherical aberration curves, astigmatic field curves and a distortion curve of the optical imaging device according to the 7th embodiment.

FIG. 13 is a schematic view of an optical imaging device according to the 7th embodiment of the present disclosure. FIG. 14 shows, in order from left to right, spherical aberration curves, astigmatic field curves and a distortion curve of the optical imaging device according to the 7th embodiment.

In FIG. 13, the optical imaging device includes the optical imaging lens assembly (not otherwise herein labeled) of the present disclosure and an image sensor 780. The optical imaging lens assembly includes, in order from an object side to an image side, a first lens element 710, an aperture stop 700, a second lens element 720, a third lens element 730, a fourth lens element 740, a fifth lens element 750, an IR-cut filter 760 and an image plane 770, wherein the optical imaging lens assembly has a total of five lens elements (710-750) with refractive power.

The first lens element 710 with positive refractive power has a convex object-side surface 711 and a concave image-side surface 712, which are both aspheric, and the first lens element 710 is made of plastic material.

The second lens element 720 with positive refractive power has a concave object-side surface 721 and a convex image-side surface 722, which are both aspheric, and the second lens element 720 is made of plastic material.

The third lens element 730 with positive refractive power has a concave object-side surface 731 and a convex image-side surface 732, which are both aspheric, and the third lens element 730 is made of plastic material.

The fourth lens element 740 with positive refractive power has a concave object-side surface 741 and a convex image-side surface 742, which are both aspheric, and the fourth lens element 740 is made of plastic material.

The fifth lens element 750 with negative refractive power has a convex object-side surface 751 and a concave image-side surface 752, which are both aspheric, and the fifth lens element 750 is made of plastic material. Specifically, the fifth lens element 750 has a concave image-side surface 752 in a paraxial region thereof, wherein the image-side surface 752 of the fifth lens element 750 has at least one convex shape in an off-axis region thereof.

The IR-cut filter 760 is made of glass and located between the fifth lens element 750 and the image plane 770, and will not affect the focal length of the optical imaging lens assembly. The image sensor 780 is disposed on the image plane 770 of the optical imaging lens assembly.

The detailed optical data of the 7th embodiment are shown in Table 13 and the aspheric surface data are shown in Table 14 below.

TABLE 13

7th Embodiment
f = 2.45 mm, Fno = 2.40, HFOV = 44.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.766 | ASP | 0.372 | Plastic | 1.544 | 55.9 | 3.76 |
| 2 | | 11.871 | ASP | 0.078 | | | | |
| 3 | Ape. Stop | Plano | | 0.230 | | | | |
| 4 | Lens 2 | −3.085 | ASP | 0.510 | Plastic | 1.543 | 56.5 | 2.05 |
| 5 | | −0.867 | ASP | 0.100 | | | | |
| 6 | Lens 3 | −0.740 | ASP | 0.510 | Plastic | 1.544 | 55.9 | 3.07 |
| 7 | | −0.637 | ASP | 0.100 | | | | |
| 8 | Lens 4 | −0.548 | ASP | 0.450 | Plastic | 1.640 | 23.3 | 63.15 |

TABLE 13-continued

7th Embodiment
f = 2.45 mm, Fno = 2.40, HFOV = 44.2 deg.

| Surface # | | Curvature Radius | | Thickness | Material | Index | Abbe # | Focal Length |
|---|---|---|---|---|---|---|---|---|
| 9 | | −0.714 | ASP | 0.030 | | | | |
| 10 | Lens 5 | 1.685 | ASP | 0.420 | Plastic | 1.640 | 23.3 | −2.83 |
| 11 | | 0.787 | ASP | 0.550 | | | | |
| 12 | IR-cut filter | Plano | | 0.210 | Glass | 1.517 | 64.2 | — |
| 13 | | Plano | | 0.437 | | | | |
| 14 | Image | Plano | | — | | | | |

Note:
Reference wavelength is 587.6 nm (d-line).

TABLE 14

Aspheric Coefficients

| Surface # | 1 | 2 | 4 | 5 | 6 |
|---|---|---|---|---|---|
| k = | 5.8154E−02 | −9.0000E+01 | −1.3118E−01 | −1.7232E+00 | −1.9823E+00 |
| A4 = | −2.2520E−02 | 9.6428E−04 | −3.5412E−01 | −2.9910E−01 | −1.5060E−01 |
| A6 = | 1.0462E−01 | −5.1994E−01 | 3.4306E−01 | 3.1722E−01 | 1.9255E−01 |
| A8 = | −3.6610E−01 | 1.7520E+00 | −3.7650E+00 | −1.0252E+00 | 9.9460E−02 |
| A10 = | 3.8143E−02 | −4.9434E+00 | 7.0742E+00 | 9.5236E−01 | −4.1335E−01 |
| A12 = | 5.1214E−01 | 6.6490E+00 | −1.4236E+01 | −1.3777E+00 | 2.7612E−01 |
| A14 = | −8.4253E−01 | −3.7835E+00 | 7.8660E+00 | 5.3086E−01 | −6.4012E−02 |

| Surface # | 7 | 8 | 9 | 10 | 11 |
|---|---|---|---|---|---|
| k = | −2.6966E+00 | −1.6591E+00 | −2.8024E+00 | −1.6263E+00 | −4.0537E+00 |
| A4 = | −4.9720E−01 | −3.6117E−01 | −3.7126E−01 | −2.0571E−01 | −9.4224E−02 |
| A6 = | 9.9874E−01 | 1.1964E+00 | 6.7219E−01 | 6.3306E−02 | 3.4035E−02 |
| A8 = | −1.0739E+00 | −1.7666E+00 | −7.7475E−01 | −1.2631E−02 | −9.3836E−03 |
| A10 = | 4.4879E−01 | 1.4693E+00 | 6.0805E−01 | 2.9656E−03 | 1.2931E−03 |
| A12 = | −6.2497E−02 | −7.7269E−01 | −2.6466E−01 | −7.5974E−04 | −2.0983E−05 |
| A14 = | — | 2.9068E−01 | 5.9039E−02 | 1.4448E−04 | −2.1068E−05 |
| A16 = | — | −7.1564E−02 | −6.1053E−03 | −1.6413E−05 | 2.0640E−06 |

In the optical imaging lens assembly according to the 7th embodiment, the definitions of these parameters shown in the following table are the same as those stated in the 1st embodiment with corresponding values for the 7th embodiment. Moreover, these parameters can be calculated from Table 13 and Table 14 as the following values and satisfy the following conditions:

| | 7th Embodiment | | |
|---|---|---|---|
| f [mm] | 2.45 | R8/f | −0.29 |
| Fno | 2.40 | f1/f2 | 1.83 |
| HFOV [deg.] | 44.2 | f4/f1 | 16.78 |
| V5 | 23.3 | SAG42 + CT4 [mm] | −0.17 |
| (V2 + V4 + V5)/(V1 + V3) | 0.92 | TTL/ImgH | 1.68 |
| T23/T12 | 0.32 | | |

8th Embodiment

Figure 15:
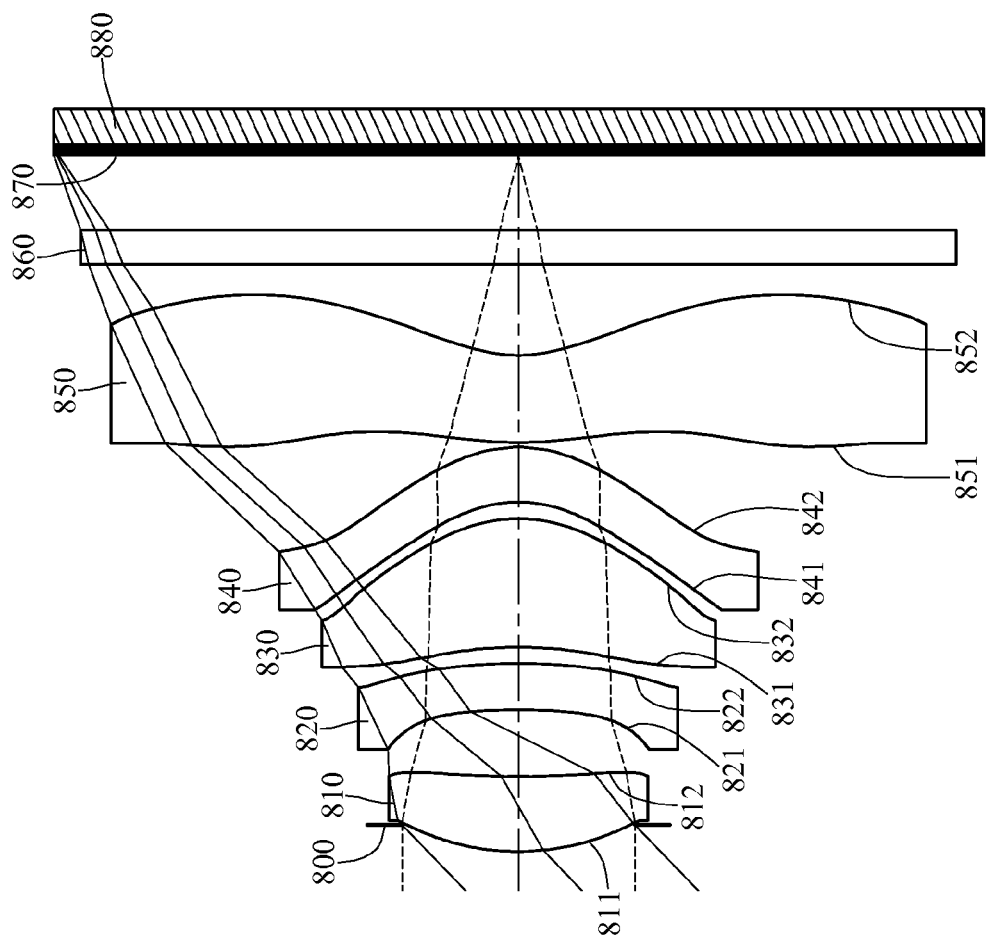
FIG. 15 is a schematic view of an optical imaging device according to the 8th embodiment of the present disclosure.
Figure 16:
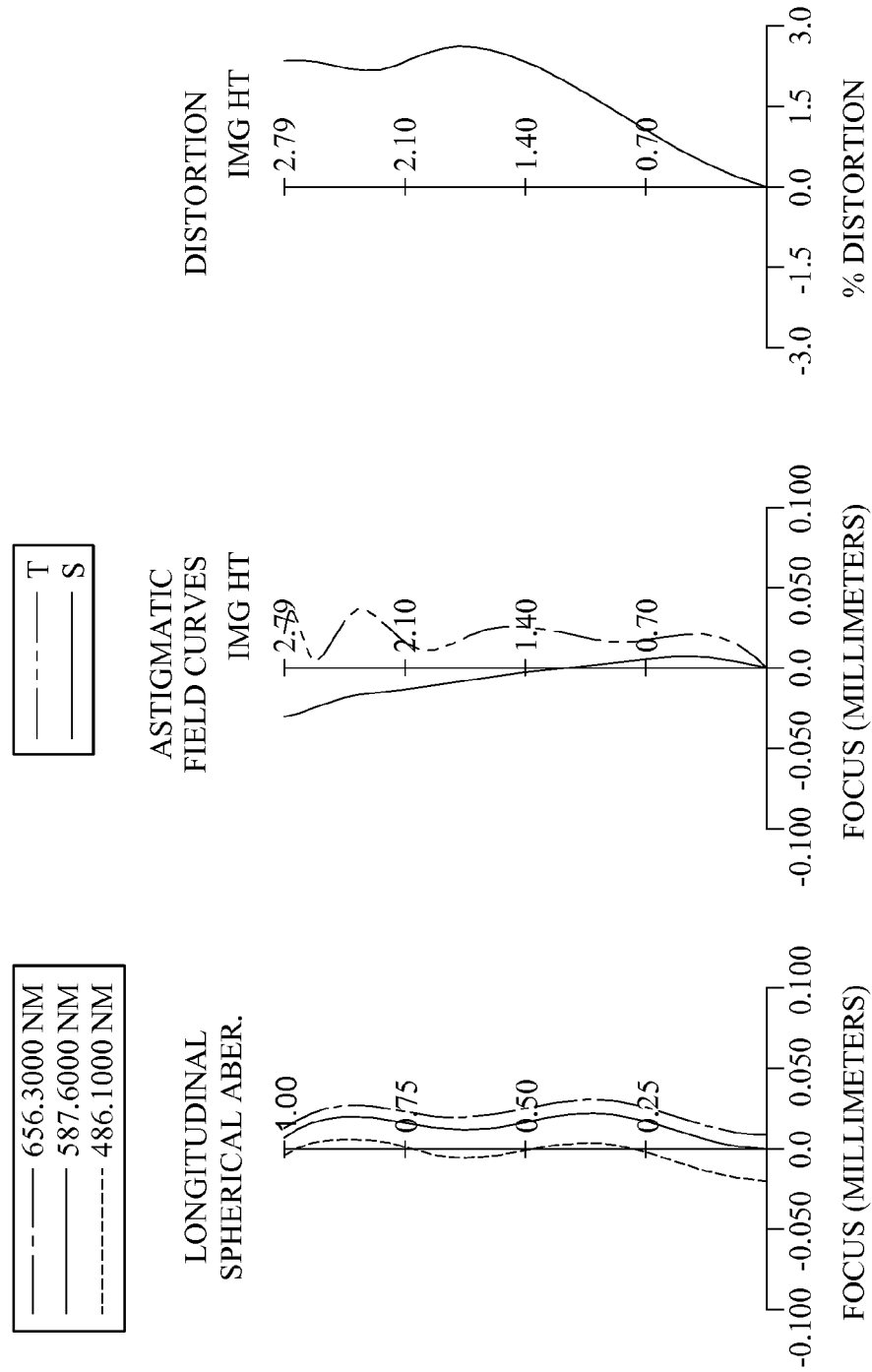
FIG. 16 shows spherical aberration curves, astigmatic field curves and a distortion curve of the optical imaging device according to the 8th embodiment.

FIG. 15 is a schematic view of an optical imaging device according to the 8th embodiment of the present disclosure. FIG. 16 shows, in order from left to right, spherical aberration curves, astigmatic field curves and a distortion curve of the optical imaging device according to the 8th embodiment.

In FIG. 15, the optical imaging device includes the optical imaging lens assembly (not otherwise herein labeled) of the present disclosure and an image sensor 880. The optical imaging lens assembly includes, in order from an object side to an image side, an aperture stop 800, a first lens element 810, a second lens element 820, a third lens element 830, a fourth lens element 840, a fifth lens element 850, an IR-cut filter 860 and an image plane 870, wherein the optical imaging lens assembly has a total of five lens elements (810-850) with refractive power.

The first lens element 810 with positive refractive power has a convex object-side surface 811 and a concave image-side surface 812, which are both aspheric, and the first lens element 810 is made of plastic material.

The second lens element 820 with positive refractive power has a concave object-side surface 821 and a convex image-side surface 822, which are both aspheric, and the second lens element 820 is made of plastic material.

The third lens element 830 with positive refractive power has a concave object-side surface 831 and a convex image-side surface 832, which are both aspheric, and the third lens element 830 is made of plastic material.

The fourth lens element 840 with positive refractive power has a concave object-side surface 841 and a convex image-side surface 842, which are both aspheric, and the fourth lens element 840 is made of plastic material.

The fifth lens element 850 with negative refractive power has a convex object-side surface 851 and a concave image-side surface 852, which are both aspheric, and the fifth lens element 850 is made of plastic material. Specifically, the fifth lens element 850 has a concave image-side surface 852 in a paraxial region thereof, wherein the image-side surface 852 of the fifth lens element 850 has at least one convex shape in an off-axis region thereof.

The IR-cut filter 860 is made of glass and located between the fifth lens element 850 and the image plane 870, and will not affect the focal length of the optical imaging lens assembly. The image sensor 880 is disposed on the image plane 870 of the optical imaging lens assembly.

The detailed optical data of the 8th embodiment are shown in Table 15 and the aspheric surface data are shown in Table 16 below.

TABLE 15

8th Embodiment
f = 2.82 mm, Fno = 2.00, HFOV = 44.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.161 | | | | |
| 2 | Lens 1 | 1.502 | ASP | 0.456 | Plastic | 1.544 | 55.9 | 3.67 |
| 3 | | 5.423 | ASP | 0.405 | | | | |
| 4 | Lens 2 | −4.126 | ASP | 0.281 | Plastic | 1.640 | 23.3 | 51.57 |
| 5 | | −3.765 | ASP | 0.100 | | | | |
| 6 | Lens 3 | −2.197 | ASP | 0.780 | Plastic | 1.544 | 55.9 | 2.29 |
| 7 | | −0.894 | ASP | 0.100 | | | | |
| 8 | Lens 4 | −0.802 | ASP | 0.333 | Plastic | 1.640 | 23.3 | 10.84 |
| 9 | | −0.836 | ASP | 0.030 | | | | |
| 10 | Lens 5 | 2.430 | ASP | 0.529 | Plastic | 1.640 | 23.3 | −2.41 |
| 11 | | 0.863 | ASP | 0.550 | | | | |
| 12 | IR-cut filter | Plano | | 0.210 | Glass | 1.517 | 64.2 | — |
| 13 | | Plano | | 0.455 | | | | |
| 14 | Image | Plano | | — | | | | |

Note:
Reference wavelength is 587.6 nm (d-line).

TABLE 16

Aspheric Coefficients

| Surface # | 2 | 3 | 4 | 5 | 6 |
|---|---|---|---|---|---|
| k = | 2.1062E−01 | −4.9939E+01 | −4.8687E+01 | −5.0000E+01 | −1.7474E+01 |
| A4 = | −6.6283E−03 | 5.1488E−02 | −3.2706E−01 | −1.8232E−01 | −1.0565E−01 |
| A6 = | 8.1197E−02 | −4.5309E−01 | 5.4350E−01 | 4.0805E−01 | 2.0535E−01 |
| A8 = | −2.7577E−01 | 1.8016E+00 | −3.7270E+00 | −1.0272E+00 | 9.5436E−02 |
| A10 = | 1.4720E−01 | −5.1276E+00 | 9.8433E+00 | 1.5859E+00 | −3.7101E−01 |
| A12 = | 5.1214E−01 | 6.6490E+00 | −1.4236E+01 | −1.3777E+00 | 2.6782E−01 |
| A14 = | −8.4253E−01 | −3.7835E+00 | 7.8660E+00 | 5.3086E−01 | −6.4012E−02 |

| Surface # | 7 | 8 | 9 | 10 | 11 |
|---|---|---|---|---|---|
| k = | −3.8428E+00 | −1.8475E+00 | −3.3772E+00 | −2.1237E+00 | −4.3464E+00 |
| A4 = | −4.8947E−01 | −3.4440E−01 | −3.6654E−01 | −1.9757E−01 | −9.5648E−02 |
| A6 = | 1.0203E+00 | 1.2103E+00 | 6.6902E−01 | 7.0506E−02 | 3.8107E−02 |
| A8 = | −1.0630E+00 | −1.7554E+00 | −7.7980E−01 | −1.2547E−02 | −9.9675E−03 |
| A10 = | 4.6209E−01 | 1.4626E+00 | 6.0494E−01 | 2.7775E−03 | 1.2773E−03 |
| A12 = | −5.3733E−02 | −7.8957E−01 | −2.6621E−01 | −8.1786E−04 | −1.1002E−05 |
| A14 = | — | 2.6969E−01 | 5.9845E−02 | 1.3254E−04 | −1.2608E−05 |
| A16 = | — | −4.3198E−02 | −5.4169E−03 | −8.0616E−06 | 7.9312E−07 |

| 8th Embodiment | | | |
|---|---|---|---|
| f [mm] | 2.82 | R8/f | −0.30 |
| Fno | 2.00 | f1/f2 | 0.07 |
| HFOV [deg.] | 44.0 | f4/f1 | 2.96 |
| V5 | 23.3 | SAG42 + CT4 [mm] | −0.30 |
| (V2 + V4 + V5)/(V1 + V3) | 0.63 | TTL/ImgH | 1.49 |
| T23/T12 | 0.25 | | |

The aforementioned optical imaging device can be installed in the mobile terminals. The first through fourth lens elements of the optical imaging lens assembly all have posi- In the optical imaging lens assembly according to the 8th embodiment, the definitions of these parameters shown in the following table are the same as those stated in the 1st embodiment with corresponding values for the 8th embodiment. Moreover, these parameters can be calculated from Table 15 and Table 16 as the following values and satisfy the following conditions:

tive refractive power; therefore, it is favorable for effectively distributing the light gathering ability of the mobile terminals so as to avoid the aberration from being excessively increased in a peripheral region of an image. Furthermore, it is also favorable for effectively reducing the refractive power of the first lens element so as to enlarge the field of view of mobile terminals and effectively reduce the distortion of the image in the peripheral region.

The foregoing description, for purpose of explanation, has been described with reference to specific embodiments. It is to be noted that TABLES 1-16 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An optical imaging lens assembly comprising, in order from an object side to an image side:
a first lens element having positive refractive power;
a second lens element having positive refractive power;
a third lens element having positive refractive power;
a fourth lens element with positive refractive power having a convex image-side surface; and
a fifth lens element with refractive power having a concave image-side surface in a paraxial region thereof, wherein the image-side surface of the fifth lens element has at least one convex shape in an off-axis region thereof, and an object-side surface and the image-side surface of the fifth lens element are aspheric;
wherein the optical imaging lens assembly has a total of five lens elements with refractive power, a focal length of the optical imaging lens assembly is f, a curvature radius of the image-side surface of the fourth lens element is R8, and the following condition is satisfied:

$-0.45 < R8/f < 0$.

2. The optical imaging lens assembly of claim 1, wherein the first lens element has a convex object-side surface, and the fifth lens element has a convex object-side surface.

3. The optical imaging lens assembly of claim 1, wherein the fifth lens element has negative refractive power.

4. The optical imaging lens assembly of claim 1, wherein the fourth lens element has a concave object-side surface, and at least three lens elements among the first through fifth lens elements are made of plastic material.

5. The optical imaging lens assembly of claim 1, wherein the third lens element has a concave object-side surface and a convex image-side surface.

6. The optical imaging lens assembly of claim 1, wherein a distance in parallel with an optical axis from an axial vertex on the image-side surface of the fourth lens element to a maximum effective radius position on the image-side surface of the fourth lens element is SAG42, a central thickness of the fourth lens element is CT4, and the following condition is satisfied:

$SAG42 + CT4 < 0$ mm.

7. The optical imaging lens assembly of claim 1, wherein an axial distance between an object-side surface of the first lens element and an image plane is TTL, a maximum image height of the optical imaging lens assembly is ImgH, and the following condition is satisfied:

$TTL/ImgH < 1.9$.

8. An optical imaging lens assembly comprising, in order from an object side to an image side:
a first lens element with positive refractive power having a convex object-side surface;
a second lens element with positive refractive power having a concave object-side surface and a convex image-side surface;
a third lens element having positive refractive power;
a fourth lens element having positive refractive power; and
a fifth lens element with refractive power having a concave image-side surface in a paraxial region thereof, wherein the image-side surface of the fifth lens element has at least one convex shape in an off-axis region thereof, and an object-side surface and the image-side surface of the fifth lens element are aspheric;
wherein the optical imaging lens assembly has a total of five lens elements with refractive power.

9. The optical imaging lens assembly of claim 8, wherein the fifth lens element has a convex object-side surface.

10. The optical imaging lens assembly of claim 8, wherein for each of the first through fifth lens elements, the product of a curvature radius of an object-side surface of each lens element multiplied by a curvature radius of the corresponding image-side surface of the same lens element in the optical imaging lens assembly is positive.

11. The optical imaging lens assembly of claim 8, wherein an Abbe number of the fifth lens element is V5, and the following condition is satisfied:

$V5 < 30$.

12. The optical imaging lens assembly of claim 8, wherein a focal length of the first lens element is f1, a focal length of the fourth lens element is f4, and the following condition is satisfied:

$0 < f4/f1 < 1.85$.

13. The optical imaging lens assembly of claim 8, wherein half of a maximal field of view of the optical imaging lens assembly is HFOV, and the following condition is satisfied:

38 degrees $< HFOV <$ 60 degrees.

14. An optical imaging lens assembly comprising, in order from an object side to an image side:
a first lens element with positive refractive power having a convex object-side surface;
a second lens element having positive refractive power;
a third lens element having positive refractive power;
a fourth lens element having positive refractive power; and
a fifth lens element with refractive power having a concave image-side surface in a paraxial region thereof, wherein the image-side surface of the fifth lens element has at least one convex shape in an off-axis region thereof, and an object-side surface and the image-side surface of the fifth lens element are aspheric;
wherein the optical imaging lens assembly has a total of five lens elements with refractive power, an axial distance between the second lens element and the third lens element is T23, an axial distance between the first lens element and the second lens element is T12, and the following condition is satisfied:

$0 < T23/T12 < 1.3$.

15. The optical imaging lens assembly of claim 14, wherein half of a maximal field of view of the optical imaging lens assembly is HFOV, and the following condition is satisfied:

38 degrees $< HFOV <$ 60 degrees.

16. The optical imaging lens assembly of claim 14, wherein a focal length of the first lens element is f1, a focal length of the second lens element is f2, and the following condition is satisfied:

$$0<f1/f2<2.$$

17. The optical imaging lens assembly of claim 14, wherein an Abbe number of the first lens element is V1, an Abbe number of the second lens element is V2, an Abbe number of the third lens element is V3, an Abbe number of the fourth lens element is V4, an Abbe number of the fifth lens element is V5, and the following condition is satisfied:

$$0.4<(V2+V4+V5)/(V1+V3)<1.0.$$

18. An optical imaging lens assembly comprising, in order from an object side to an image side:
   a first lens element having positive refractive power;
   a second lens element having positive refractive power;
   a third lens element having positive refractive power;
   a fourth lens element having positive refractive power; and
   a fifth lens element with refractive power having a concave image-side surface in a paraxial region thereof, wherein the image-side surface of the fifth lens element has at least one convex shape in an off-axis region thereof, and an object-side surface and the image-side surface of the fifth lens element are aspheric;
   wherein the optical imaging lens assembly has a total of five lens elements with refractive power, a focal length of the first lens element is f1, a focal length of the fourth lens element is f4, and the following condition is satisfied:

$$0<f4/f1<1.85.$$

19. The optical imaging lens assembly of claim 18, wherein the fourth lens element has a concave object-side surface and a convex image-side surface, and the fifth lens element has negative refractive power.

20. The optical imaging lens assembly of claim 18, wherein the focal length of the first lens element is f1, the focal length of the fourth lens element is f4, and the following condition is satisfied:

$$0<f4/f1<1.55.$$

21. The optical imaging lens assembly of claim 18, wherein a distance in parallel with an optical axis from an axial vertex on the image-side surface of the fourth lens element to a maximum effective radius position on an image-side surface of the fourth lens element is SAG42, a central thickness of the fourth lens element is CT4, and the following condition is satisfied:

$$SAG42+CT4<0 \text{ mm}.$$

22. The optical imaging lens assembly of claim 18, wherein an Abbe number of the fifth lens element is V5, and the following condition is satisfied:

$$V5<30.$$

23. An optical imaging device comprising, in order from an object side to an image side:
   an optical imaging lens assembly; and
   an image sensor.
   wherein the optical imaging lens assembly comprising, in order from an object side to an image side:
   a first lens element having positive refractive power;
   a second lens element having positive refractive power;
   a third lens element having positive refractive power;
   a fourth lens element having positive refractive power; and
   a fifth lens element with refractive power having a concave image-side surface in a paraxial region thereof, wherein the image-side surface of the fifth lens element has at least one convex shape in an off-axis region thereof, and an object-side surface and the image-side surface of the fifth lens element are aspheric;
   wherein the optical imaging lens assembly has a total of five lens elements with refractive power, a focal length of the first lens element is f1, a focal length of the fourth lens element is f4, and the following condition is satisfied:

$$0<f4/f1<1.85.$$

24. A mobile terminal comprising,
   an optical imaging device comprising, in order from an object side to an image side:
   an optical imaging lens assembly; and
   an image sensor.
   wherein the optical imaging lens assembly comprising, in order from an object side to an image side:
   a first lens element having positive refractive power;
   a second lens element having positive refractive power;
   a third lens element having positive refractive power;
   a fourth lens element having positive refractive power; and
   a fifth lens element with refractive power having a concave image-side surface in a paraxial region thereof, wherein the image-side surface of the fifth lens element has at least one convex shape in an off-axis region thereof, and an object-side surface and the image-side surface of the fifth lens element are aspheric;
   wherein the optical imaging lens assembly has a total of five lens elements with refractive power, a focal length of the first lens element is f1, a focal length of the fourth lens element is f4, and the following condition is satisfied:

$$0<f4/f1<1.85.$$

* * * * *